United States Patent
Watanabe

(10) Patent No.: US 11,316,432 B2
(45) Date of Patent: Apr. 26, 2022

(54) DC-DC CONVERTER

(71) Applicant: KABUSHIKI KAISHA TOYOTA JIDOSHOKKI, Kariya (JP)

(72) Inventor: Kenichi Watanabe, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 16/897,797

(22) Filed: Jun. 10, 2020

(65) Prior Publication Data

US 2020/0395859 A1    Dec. 17, 2020

(30) Foreign Application Priority Data

Jun. 11, 2019    (JP) .............................. JP2019-109094

(51) Int. Cl.
*H02M 3/335* (2006.01)
*H02M 1/42* (2007.01)
*H02M 1/34* (2007.01)
*H02M 1/08* (2006.01)

(52) U.S. Cl.
CPC ......... *H02M 3/33576* (2013.01); *H02M 1/08* (2013.01); *H02M 1/34* (2013.01); *H02M 1/348* (2021.05); *H02M 1/4233* (2013.01); *H02M 3/33569* (2013.01); *H02M 3/33592* (2013.01)

(58) Field of Classification Search
CPC .......... H02M 1/4233; H02M 3/33569; H02M 3/33576; H02M 3/33592

USPC ................................................ 363/17, 21.01
See application file for complete search history.

(56) References Cited

U.S. PATENT DOCUMENTS

| 4,754,385 A | 6/1988 | McDade et al. | |
|---|---|---|---|
| 2002/0136032 A1 | 9/2002 | Zhange et al. | |
| 2010/0226154 A1* | 9/2010 | Leu | H02M 1/34 363/106 |
| 2010/0246215 A1* | 9/2010 | Mase | H02M 1/40 363/21.04 |
| 2012/0033456 A1* | 2/2012 | Koike | H02M 3/33569 363/21.04 |
| 2018/0034360 A1* | 2/2018 | Hirabayashi | H02M 3/33592 |
| 2018/0131286 A1* | 5/2018 | Song | H02M 3/33592 |

FOREIGN PATENT DOCUMENTS

| CN | 101355305 A | 1/2009 |
|---|---|---|
| DE | 696 26 743 T2 | 2/2004 |
| JP | 2005-033867 A | 2/2005 |
| JP | 2017-034793 A | 2/2017 |

* cited by examiner

*Primary Examiner* — Gary A Nash
(74) *Attorney, Agent, or Firm* — Sughrue Mion, PLLC

(57) ABSTRACT

A DC-DC converter is composed a transformer; a cutoff switch connected between one of terminals of a primary winding of the transformer and one of terminals of a power source; a driving switch connected between the other of the terminals of the primary winding and the other of the terminals of the power source; and a control unit that alternately repeats turning on the cutoff switch and the driving switch, and turning off the cutoff switch and the driving switch.

16 Claims, 19 Drawing Sheets

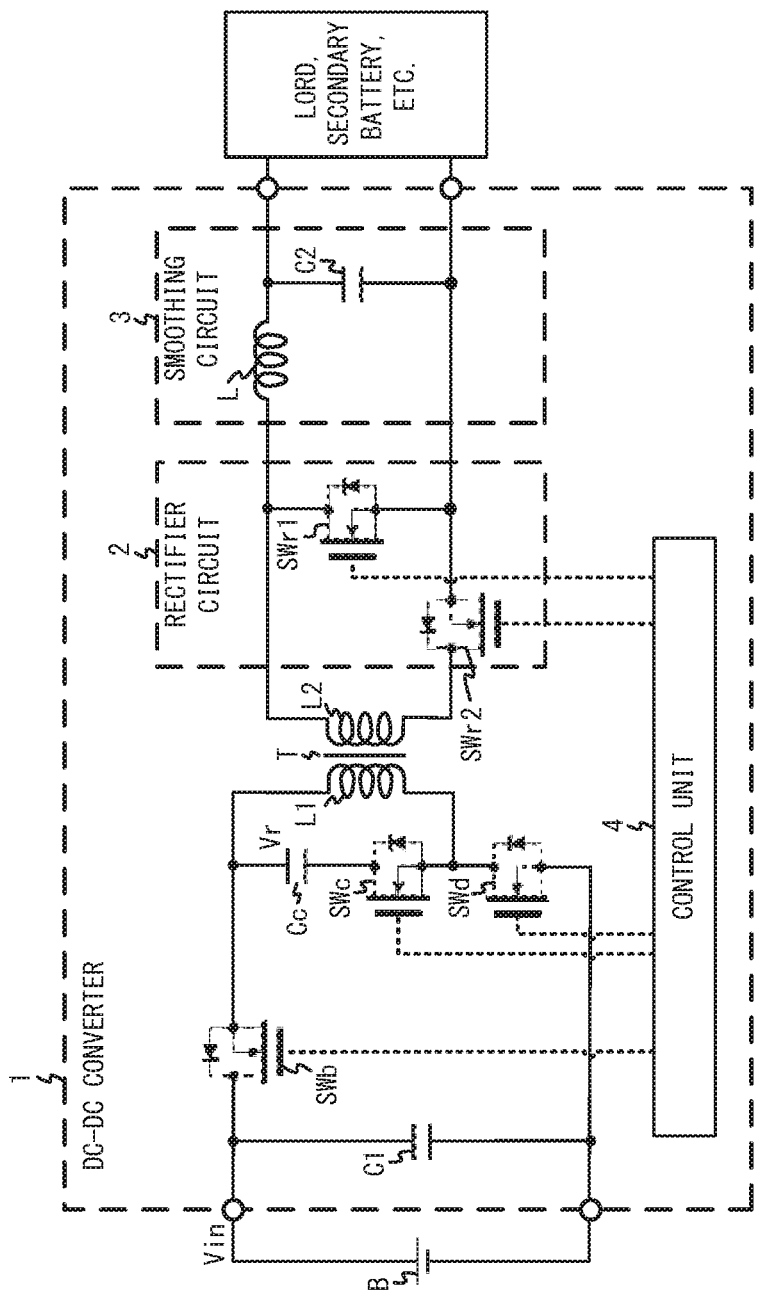
F I G. 6

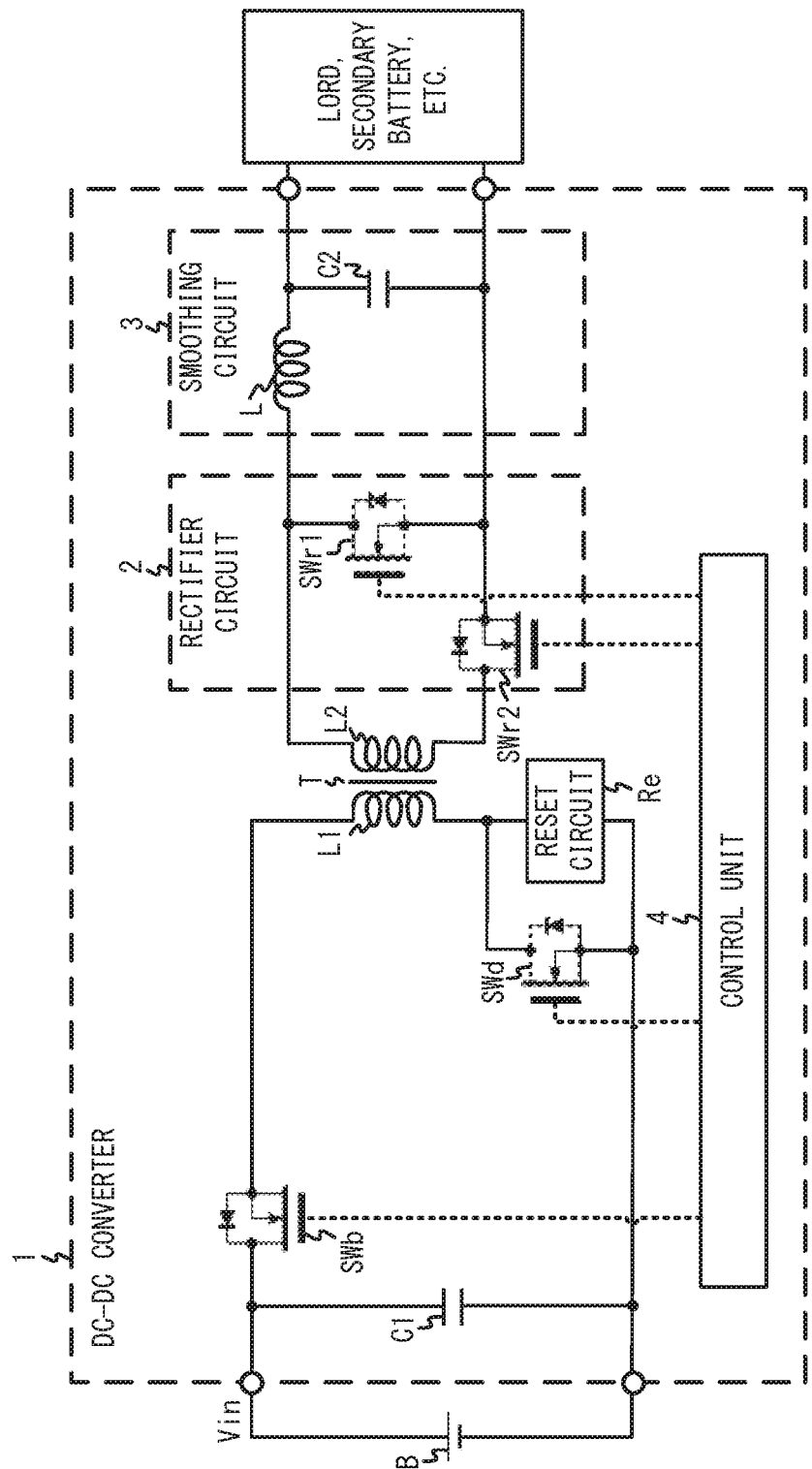
F I G. 7

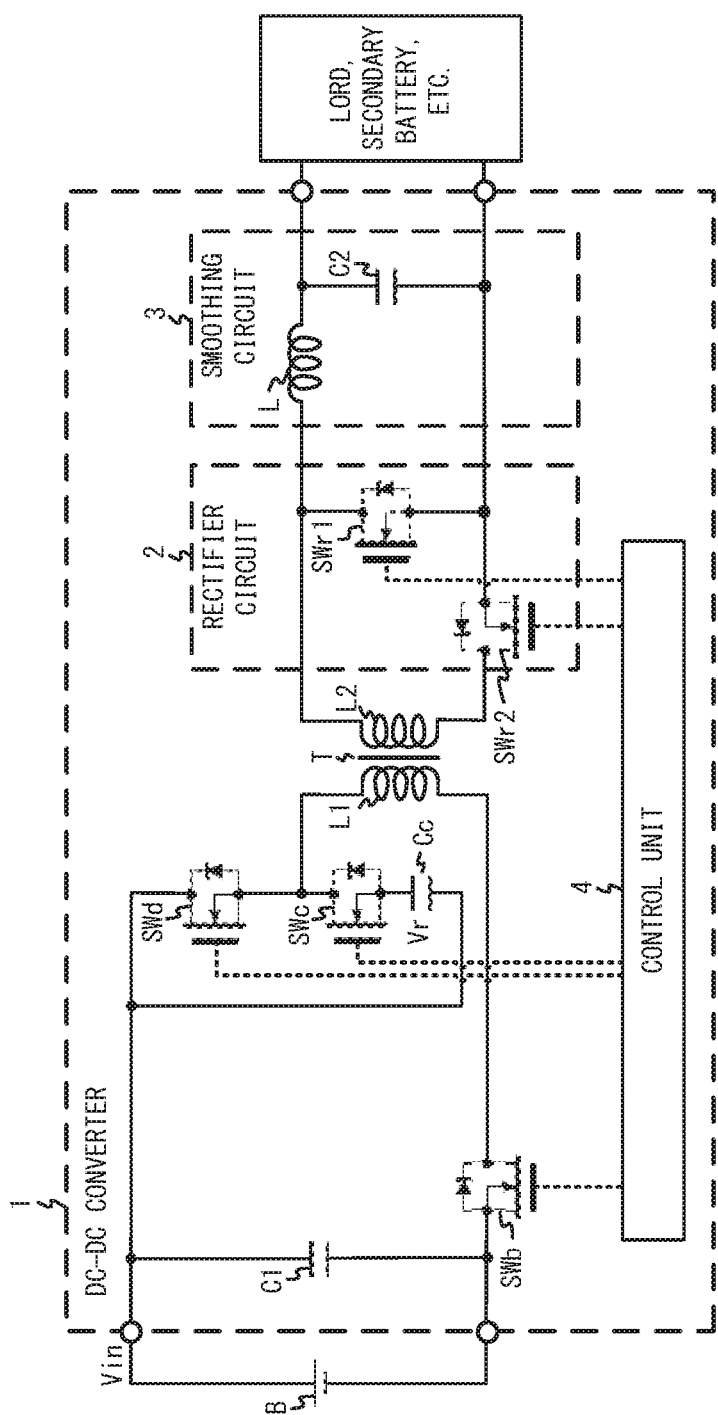
F I G. 12

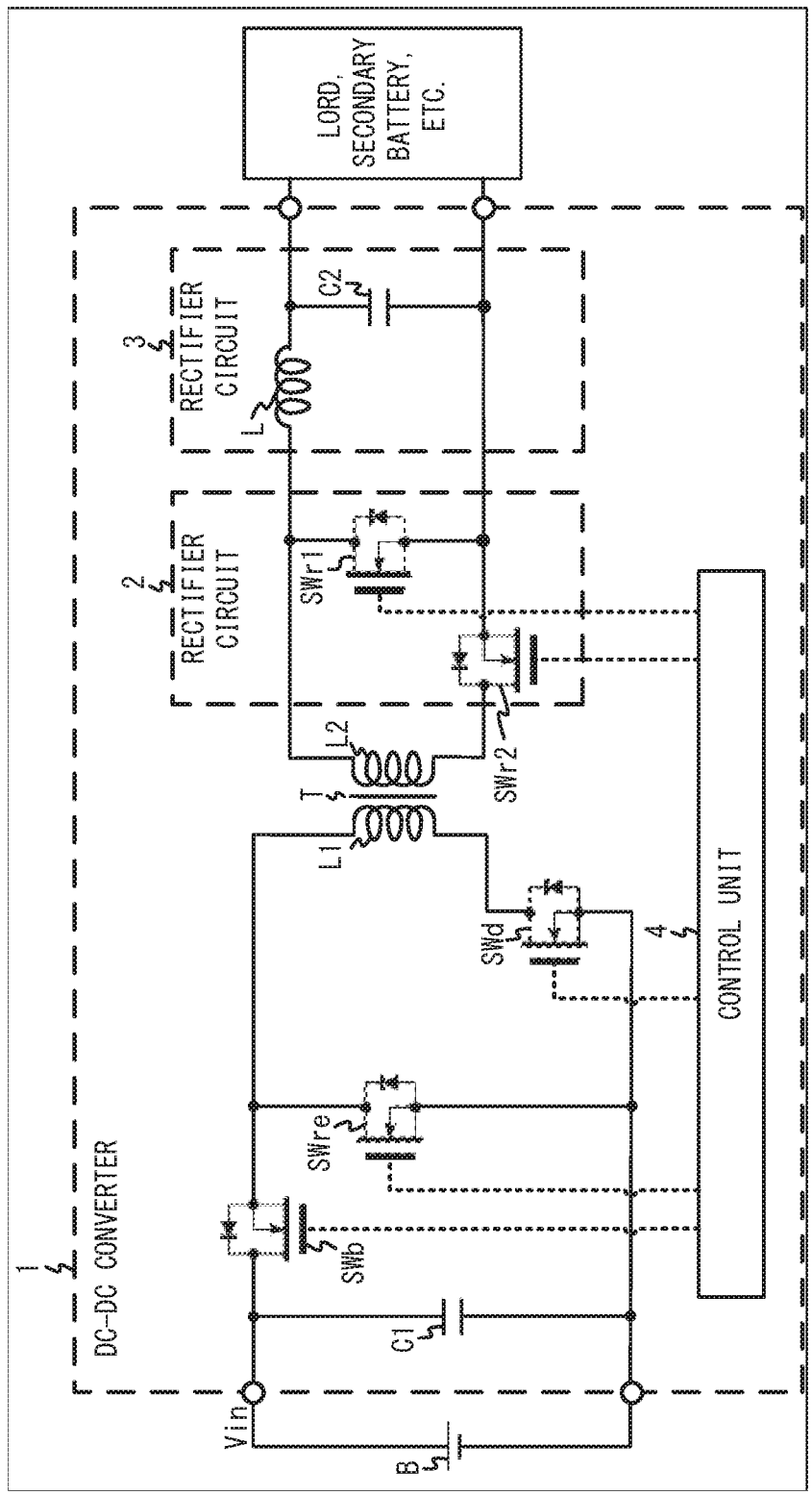
F I G. 15

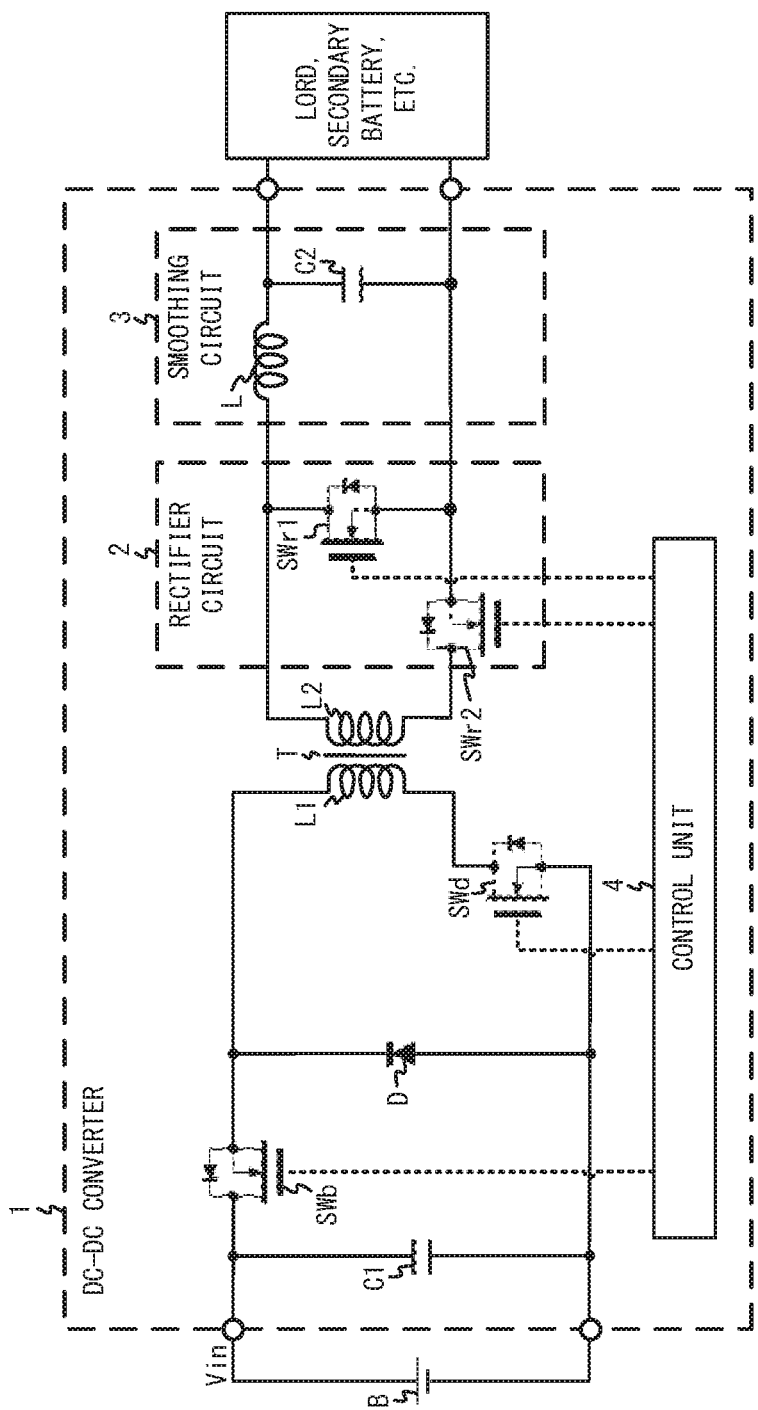
F I G. 16

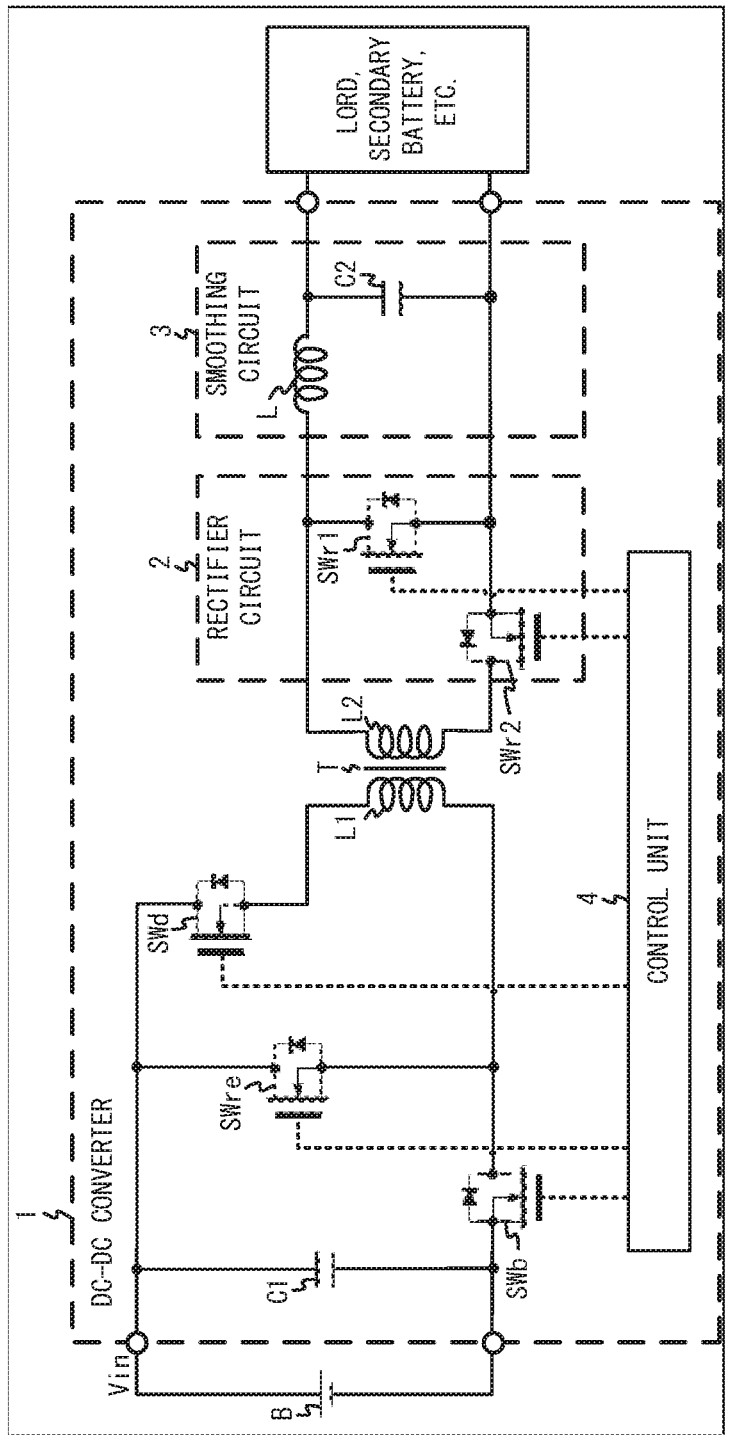
F I G. 17

DC-DC CONVERTER

CROSS-REFERENCE TO RELATED APPLICATIONS

This application is based upon and claims the benefit of priority from the prior Japanese Patent Application No. 2019-109094 filed on Jun. 11, 2019, the entire contents of which are incorporated herein by reference.

FIELD

The present invention relates to a DC-DC converter.

BACKGROUND

As a type of DC-DC converters, for example, the DC-DC converters of the active clamp system have been known. The DC-DC converters include one consists of a driving switch in which one of the terminals is connected to one of the terminals of the primary winding of the transformer and the other of the terminals is connected to the negative terminal of the power source, a clamp switch in which one of the terminals is connected to the connection point of one of the terminals of the primary winding and one of the terminals of the driving switch, and a capacitor in which one of the terminals is connected to the other of the terminals of the clamp switch and the other of the terminals is connected to the connection point of the positive terminal of the power source and the other of the terminals of the primary winding, converting the direct-current power supplied from the power source into a prescribed power by turning the driving switch and the clamp switch alternatively on and off, while suppressing the saturation of the primary winding.

Related arts include Japanese Laid-open Patent Publication No. 2017-34793.

However, in the DC-DC converter mentioned above, not only the input voltage but also the voltage on the capacitor is applied to the driving switch, and therefore, the withstand voltage of the driving switch needs to be increased accordingly, leading to higher cost and on-resistance of the driving switch. For this reason, there are concerns for a higher production cost and a lower efficiency of the DC-DC converter. The problem of a higher voltage applied to the switch also applies to other DC-DC converters.

SUMMARY

Therefore, an objective according to an aspect of the present invention is to provide a DC-DC converter in which the withstand voltages of the switches may be suppressed.

A DC-DC converter according to an embodiment of the present invention is equipped with a transformer, a cutoff switch connected between one of terminals of a primary winding of the transformer and one of the terminals of the power source, a driving switch connected between the other of the terminals of the primary winding and the other of the terminals of the power source, and a control unit that alternately repeats turning on the cutoff switch and the driving switch, and turning off the cutoff switch and the driving switch.

Accordingly, while the cutoff switch and the driving switch are off, it is possible not to include the voltage of the power source in the voltage applied to one of the cutoff switch and the driving switch and limit the voltage applied to the other of the switches only to the voltage of the power supply, and therefore, it is possible to suppress the withstand voltage of the cutoff switch and the driving switch.

Meanwhile, the DC-DC converter may be equipped with a reset switch in which one of the terminals of the reset switch is connected to the connection point of one of the terminals of the cutoff switch and one of the terminals of the primary winding, and other of the terminals of the reset switch is connected to the connection point of one of the terminals of the driving switch and the other of the terminals of the power source, and the control unit may alternately repeat turning on the cutoff switch and the driving switch while turning off the reset switch, and turning on the cutoff switch and the driving switch while turning on the reset switch.

Accordingly, when the cutoff switch and the driving switch are switched from on to off and the reset switch are switched from off to on, the current flows from one of the ends of the primary winding to the other of the ends of the primary winding via a diode connected in parallel to the reset switch and the driving switch, making it possible to reset the energy stored in the primary winding.

Meanwhile, the DC-DC converter may be equipped with a diode connected between the connection point of one of the terminals of the cutoff switch and one of the terminals of the primary winding, and a connection point of one of the terminals of the driving switch and the other of the terminals of the power source.

Meanwhile, in the DC-DC converter, a snubber circuit or a reset circuit may be connected to the connection point of the other of the terminals of the primary winding and the other of the terminals of the driving switch.

Accordingly, it is possible to reduce ringing caused by the turning on or off of the cutoff switch and the driving switch, and therefore, it is possible to further suppress the withstand voltage of the cutoff switch and the driving switch.

Meanwhile, the DC-DC converter may be equipped with a clamp switch in which one of the terminals of the clamp switch is connected to the connection point of the other of the terminals of the primary winding and the other of the terminals of the driving switch, and a capacitor in which one of the terminals of the capacitor is connected to the other of the terminals of the clamp switch and the other of the terminals of the capacitor is connected to the connection point of one of the terminals of the driving switch and the other of the terminals of the power source, and the control unit may alternately repeat turning on the cutoff switch and the driving switch while turning off the clamp switch, and turning off the cutoff switch and the driving switch while turning on the clamp switch.

Accordingly, when the cutoff switch and the driving switch are switched from on to off and the clamp switch are switched from off to on, the voltage applied to the capacitor is applied to one of the cutoff switch and the driving switch, and the input voltage is applied to the other of the cutoff switch and the driving switch. Meanwhile, when the cutoff switch and the driving switch are switched from off to on and the clamp switch are switched from on to off, the voltage applied to the capacitor is applied to the clamp switch. Thus, it is possible not to apply the total voltage of the input voltage and the voltage applied to the capacitor to the cutoff switch, the driving switch, and the clamp switch, it is possible to suppress the withstand voltages of the cutoff switch, the driving switch, and the clamp switch.

Meanwhile, the DC-DC converter may be equipped with a clamp switch in which one of the terminals of the clamp switch is connected to the connection point of the other of the terminals of the primary winding and the other of the terminals of the driving switch, and a capacitor in which one of the terminals of the capacitor is connected to the other of the terminals of the clamp switch and the other of the terminals of the capacitor is connected to the connection point of one of the terminals of the cutoff switch and one of the terminals of the primary winding, and the control unit may alternately repeat tuning on the cutoff switch and the driving switch while turning off the clamp switch, and turning off the cutoff switch and the driving switch while turning on the clamp switch.

Accordingly, when the cutoff switch and the driving switch are switched from on to off and the clamp switch is switched from off to on, the voltage applied to the capacitor is applied to one of the cutoff switch and the driving switch, and the input voltage is applied to the other of the cutoff switch and the driving switch. Meanwhile, when the cutoff switch and the driving switch are switched from off to on and the clamp switch is switched from on to off, the voltage applied to the capacitor is applied to the clamp switch. Thus, it is possible not to apply the total voltage of the input voltage and the voltage applied to the capacitor to the cutoff switch, the driving switch, and the clamp switch, and therefore, it is possible to suppress the withstand voltages of the cutoff switch, the driving switch, and the clamp switch.

Meanwhile, the DC-DC converter maybe a DC-DC converter of the forward system.

BRIEF DESCRIPTION OF DRAWINGS

FIG. 6 illustrates an example of a DC-DC converter according to the sixth embodiment;

FIG. 7 illustrates an example of a DC-DC converter according to the seventh embodiment;

FIG. 12 illustrates an example of a DC-DC converter according to the twelfth embodiment;

FIG. 15 illustrates an example of a DC-DC converter according to the fifteenth embodiment;

FIG. 16 illustrates an example of a DC-DC converter according to the sixteenth embodiment;

FIG. 17 illustrates an example of a DC-DC converter according to the seventeenth embodiment;

DESCRIPTION OF EMBODIMENTS

Hereinafter, details of the embodiment are explained with reference to the drawings.

First Embodiment

Figure 1:
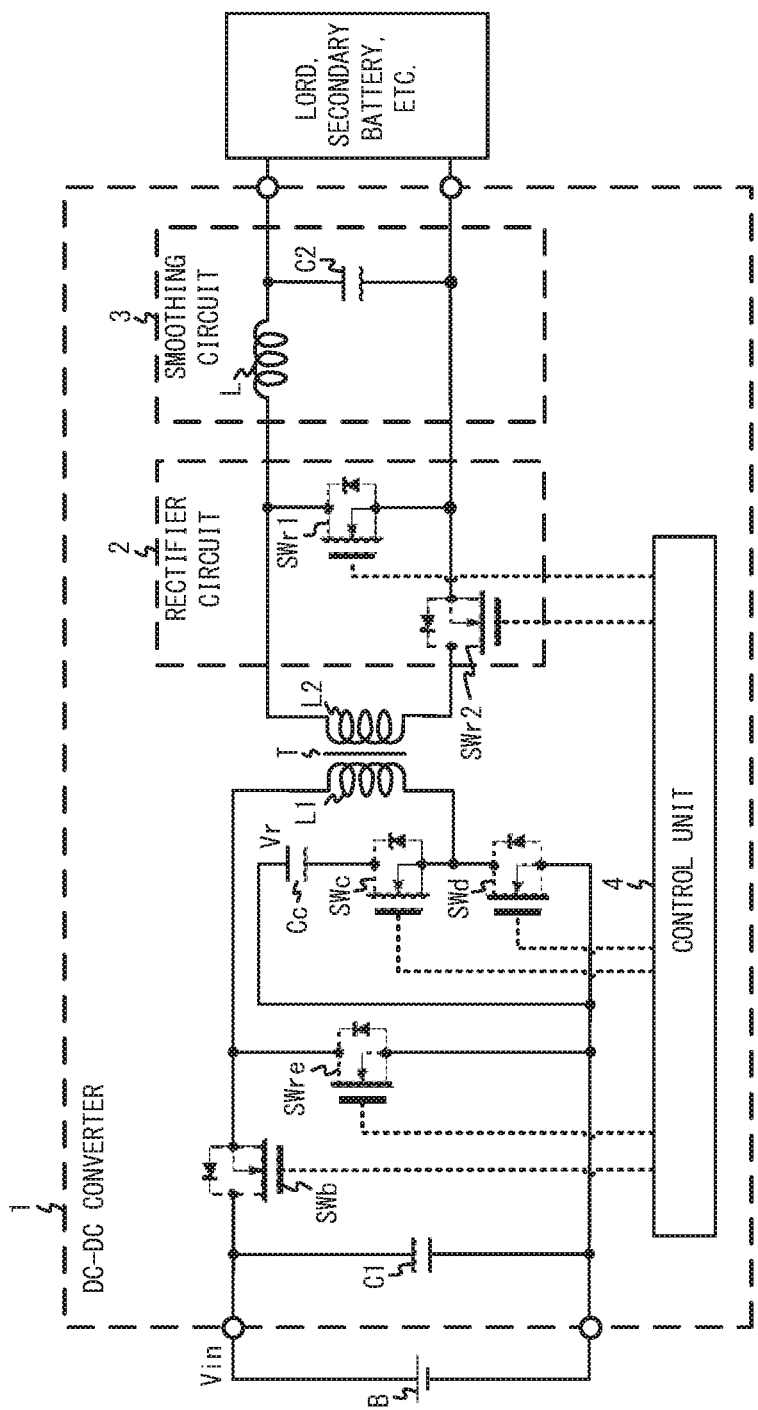
FIG. 1 illustrates an example of a DC-DC converter according to the first embodiment.

FIG. 1 illustrates an example of a DC-DC converter according to the first embodiment.

The DC-DC converter 1 illustrated in FIG. 1 is equipped with a capacitor C1, a cutoff switch SWb, a driving switch SWd, a reset switch SWre, a clamp switch SWc, a capacitor Cc, a transformer T, a rectifier circuit 2 a smoothing circuit 3, and a control unit 4 and converts the direct-current power supplied from a power source B into a prescribed power and supplies it to a load, a secondary battery, or the like.

The rectifier circuit 2 is equipped with a rectifier switch SWr1 and a rectifier switch SWr2.

The smoothing circuit 3 is equipped with the inductor L and a capacitor C2.

Meanwhile, the cutoff switch SWb, the driving switch SWd, the reset switch SWre, the clamp switch SWc, the rectifier switch SWr1, and the rectifier switch SWr2 are, respectively, an N-channel MOSFET (Metal Oxide Semiconductor Field Effect Transistor) or the like.

In addition, the rectifier switches SWr1, SWr2 may be replaced with a diode.

One of the terminals (source terminal) of the cutoff switch SWb is connected to one of the terminals of the primary winding L1 of the transformer T, and the other of the terminals (drain terminal) of the cutoff switch SWb is connected to one of the terminals (positive terminal) of the power source B. One of the terminals (source terminal) of the driving switch SWd is connected to the other of the terminals (negative terminal) of the power source B, and the other of the terminals (drain terminal) of the driving switch SWd is connected to the other of the terminals of the primary winding L1. One of the terminals (drain terminal) of the reset switch SWre is connected to the connection point of one of the terminals of the cutoff switch SWb and one of the terminals of the primary winding L1, and the other of the terminals (source terminal) of the reset switch SWre is connected to the connection point of one of the terminals of the driving switch SWd and the other of the terminals of the power source B. One of the terminals (source terminal) of the clamp switch SWc is connected to the connection point of the other of the terminals of the primary winding L1 and the other of the terminals of the driving switch SWd. One of the terminals of the capacitor Cc is connected to the other of the terminals of the clamp switch SWc, and the other of the terminals of the capacitor Cc is connected to the connection point of one of the terminals of the driving switch SWd and the other of the terminals of the power source B. One of the terminals of the secondary winding L2 of the transformer T is connected to the connection point of one of the terminals (drain terminal) of the rectifier switch SWr1 and the one of the terminals of the inductor L, and the other of the terminals of the secondary winding L2 is connected to one of the terminals (drain terminal) of the rectifier switch SWr2. The other of the terminals of the inductor L is connected to the other of the terminals of the capacitor C2. The other of the terminals (source terminal) of the rectifier switch SWr1 is connected to the connection point of the other of the terminals (source terminal) of the rectifier switch SWr2 and the other of the terminals of the capacitor C2.

The control unit 4 is composed of, for example, an IC (Integrated Circuit), a microcomputer, or the like and controls the respective operations of the cutoff switch SWb, the driving switch SWd, the reset switch SWre, the clamp switch SWc, the rectifier switch SWr1, and the rectifier switch SWr2.

That is, the control unit 4 alternately repeats turning on the cutoff switch SWb and the driving switch SWd while turning off the reset switch SWre and the clamp switch SWc, and turning off the cutoff switch SWb and the driving switch SWd while turning on the reset switch SWre and the clamp switch SWc. When the turning on and off the cutoff switch SWb and the driving switch SWd is repeated, the direct-current power supplied from the power source B is converted into the alternating-current power and conveyed from the primary winding L1 to the secondary winding L2. Meanwhile, while the control unit 4 is turning on the cutoff switch SWb and the driving switch SWd, the rectifier switch SWr1 is turned off and the rectifier switch SWr2 is turned on. Then, the current flows from the secondary winding L2 to the load, the secondary battery or the like via the inductor L and the capacitor C2. In addition, while the control unit 4 is turning off the cutoff switch SWb and the driving switch SWd, the rectifier switch SWr1 is turned on and the rectifier switch SWr2 is turned off. Then, the current flows from the rectifier switch SWr1 to the load, the secondary battery or the like via the inductor L and the capacitor C2.

Meanwhile, when the cutoff switch SWb and the driving switch SWd are switched from on to off while the reset switch SWre and the clamp switch SWc are switched from off to on, after the current flows from the other of the terminals of the primary winding L1 to one of the terminals of the primary winding L1 via the clamp switch SWc, the capacitor Cc, and the reset switch SWre, the current flows from one of the terminals of the primary winding L1 to the other of the terminals of the primary winding L1 via the reset switch SWre, the capacitor Cc, and the clamp switch SWc, discharging the energy stored in the primary winding L1 while the cutoff switch SWb and the driving switch SWd were on. Meanwhile, it is assumed that the voltage Vr is applied to the capacitor Cc when the cutoff switch SWb and the driving switch SWd are off while the reset switch SWre and the clamp switch SWc are on.

Accordingly, in the DC-DC converter 1 of the first embodiment, when the cutoff switch SWb and the driving switch SWd are switched from on to off, and the reset switch SWre and the clamp switch SWc are switched from off to on, the voltage Vr applied to the capacitor Cc is applied to the driving switch SWd, and the input voltage Vin that is the voltage of the power source B is applied to the cutoff switch SWb. Meanwhile, when the cutoff switch SWb and the driving switch SWd are switched from off to on, and the reset switch SWre and the clamp switch SWc are switched from on to off, the voltage Vr is applied to the clamp switch SWc, and the input voltage Vin is applied to the reset switch SWre. Meanwhile, while the reset switch SWre and the clamp switch SWc are on, the voltage applied to the reset switch SWre and the clamp switch SWc is zero [V], and while the cutoff switch SWb and the driving switch SWd are on, the voltage applied to the cutoff switch SWb and the driving switch SWd is zero [V]. Thus, it is possible not to apply the total voltage of the input voltage Vin and the voltage Vr applied to the capacitor Cc to the cutoff switch SWb, the driving switch SWd, the reset switch SWre, and the clamp switch SWc, and therefore, the withstand voltages of the cutoff switch SWb, the driving switch SWd, the reset switch SWre, and the clamp switch SWc may be suppressed. For this reason, it is possible to suppress higher costs and on-resistances of the cutoff switch SWb, the driving switch SWd, the reset switch SWre, and the clamp switch SWc, it is possible to suppress the increase in the production cost of the DC-DC converter 1 and decrease in the efficiency of the DC-DC converter 1.

In addition, in the DC-DC converter 1 of the first embodiment, while the clamp switch SWc is on, the potential of the other of the terminals of the capacitor Cc may be clamped to the potential of the other of the terminals (negative terminal) of the power source B, and therefore, it is possible to suppress the increase in the voltage applied to the capacitor Cc, and it is possible to suppress the voltage applied to the driving switch SWd from turning to a negative volume when the cutoff switch SWb and the driving switch SWd are switched from on to off.

Second Embodiment

Figure 2:
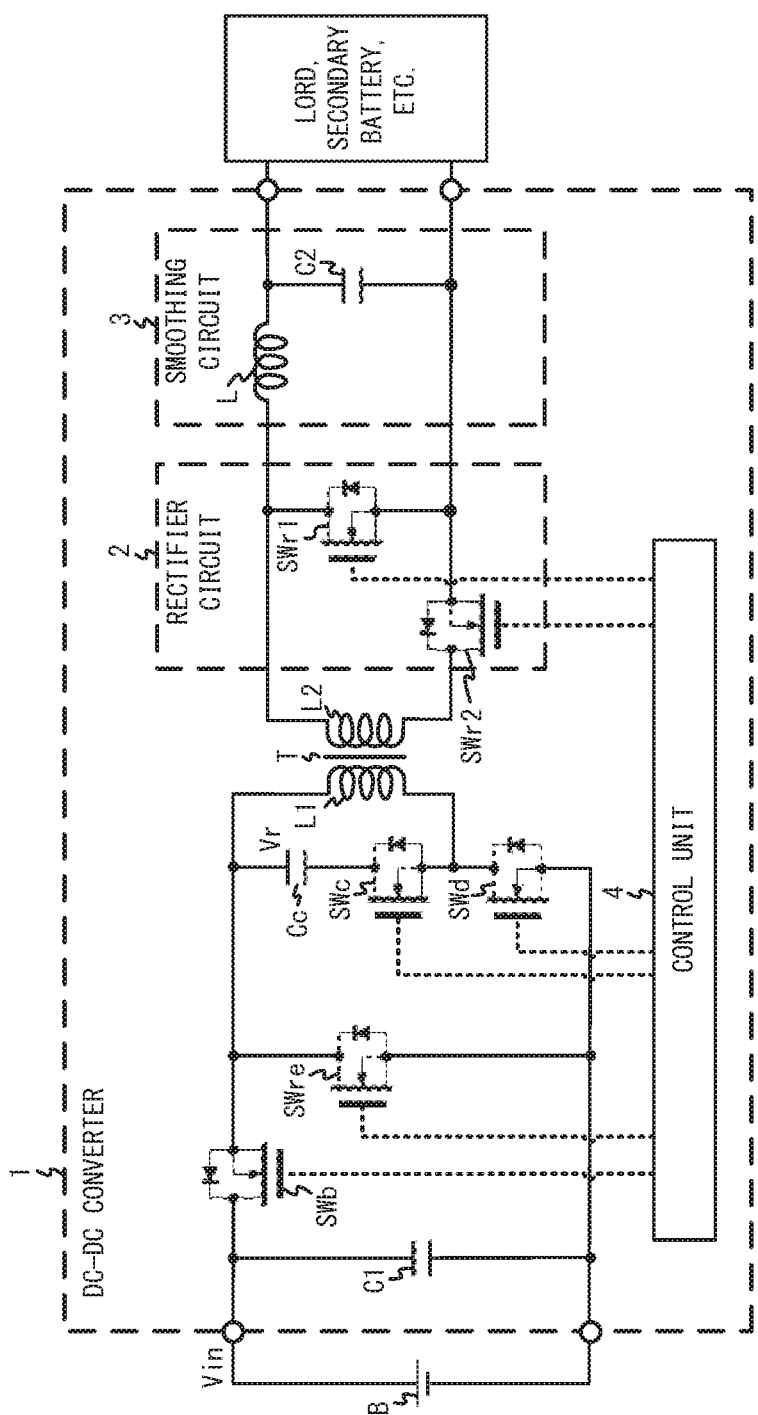
FIG. 2 illustrates an example of a DC-DC converter according to the second embodiment.

FIG. 2 illustrates an example of a DC-DC converter according to the second embodiment. Meanwhile, in the DC-DC converter 1 illustrated in FIG. 2, the same numerals are assigned to the components that are the same as those in FIG. 1, and explanation for them is omitted.

The DC-DC converter 1 illustrated in FIG. 2 differs from the DC-DC converter 1 illustrated in FIG. 1 in that the other of the terminals of the capacitor Cc is connected not the other of the terminals (negative terminal) of the power source B but to the connection point of one of the terminals of the reset switch SWre and one of the terminals of the primary winding L1. Meanwhile, it is assumed that the operations of the cutoff switch SWb, the driving switch SWd, the reset switch SWre, and the clamp switch SWc illustrated in FIG. 2 are similar to the operations of the cutoff switch SWb, the driving switch SWd, the reset switch SWre, and the clamp switch SWc in FIG. 1.

When the cutoff switch SWb and the driving switch SWd are switched from on to off while the reset switch SWre and the clamp switch SWc are switched from off to on, after the current flows from the other of the terminals of the primary winding L1 to one of the terminals of the primary winding L1 via the clamp switch SWc and the capacitor Cc, the current flows from one of the terminals of the primary winding L1 to the other of the terminals of the primary winding L1 via the capacitor Cc and the clamp switch SWc, discharging the energy stored in the primary winding L1 while the cutoff switch SWb and the driving switch SWd were on. Meanwhile, it is assumed that when the cutoff switch SWb and the driving switch SWd are off while the reset switch SWre and the clamp switch SWc are on, the voltage Vr is applied to the capacitor Cc.

In the DC-DC converter 1 of the second embodiment, when the cutoff switch SWb and the driving switch SWd are switched from on to off and the reset switch SWre and the clamp switch SWc are switched from off to on, the voltage Vr applied to the capacitor Cc is applied to the driving switch SWd, the input voltage Vin that is the voltage of the power source B is applied to the cutoff switch SWb. Meanwhile, when the cutoff switch SWb and the driving switch SWd are switched from off to on and the reset switch SWre and the clamp switch SWc are switched from on to off, the voltage Vr is applied to the clamp switch SWc, and the input voltage Vin is applied to the reset switch SWre. Thus, it is possible not to apply the total voltage of the input voltage Vin and the voltage Vr applied to the capacitor Cc to the cutoff switch SWb, the driving switch SWd, the reset switch SWre, and the clamp switch SWc, it is possible to suppress the withstand voltages of the cutoff switch SWb, the driving switch SWd, the reset switch SWre, and the clamp switch SWc. For this reason, it is possible to suppress the increase in the costs and on-resistances of the cutoff switch SWb, the driving switch SWd, the reset switch SWre, and the clamp switch SWc, and it is possible to suppress the increase in the production cost of the DC-DC converter 1 and decrease in the efficiency of the DC-DC converter 1.

Meanwhile, in the DC-DC converter 1 of the second embodiment, while the reset switch SWre and the clamp switch SWc are on, the potential of the other of the terminals of the capacitor Cc may be clamped to the potential of the other of the terminals (negative terminal) of the power source B by the reset switch SWre, it is possible to suppress the increase in the voltage applied to the capacitor Cc, and it is possible to suppress the voltage applied to the driving switch SWd from turning to a negative voltage when the cutoff switch SWb and the driving switch SWd are switched from on to off.

Third Embodiment

Figure 3:
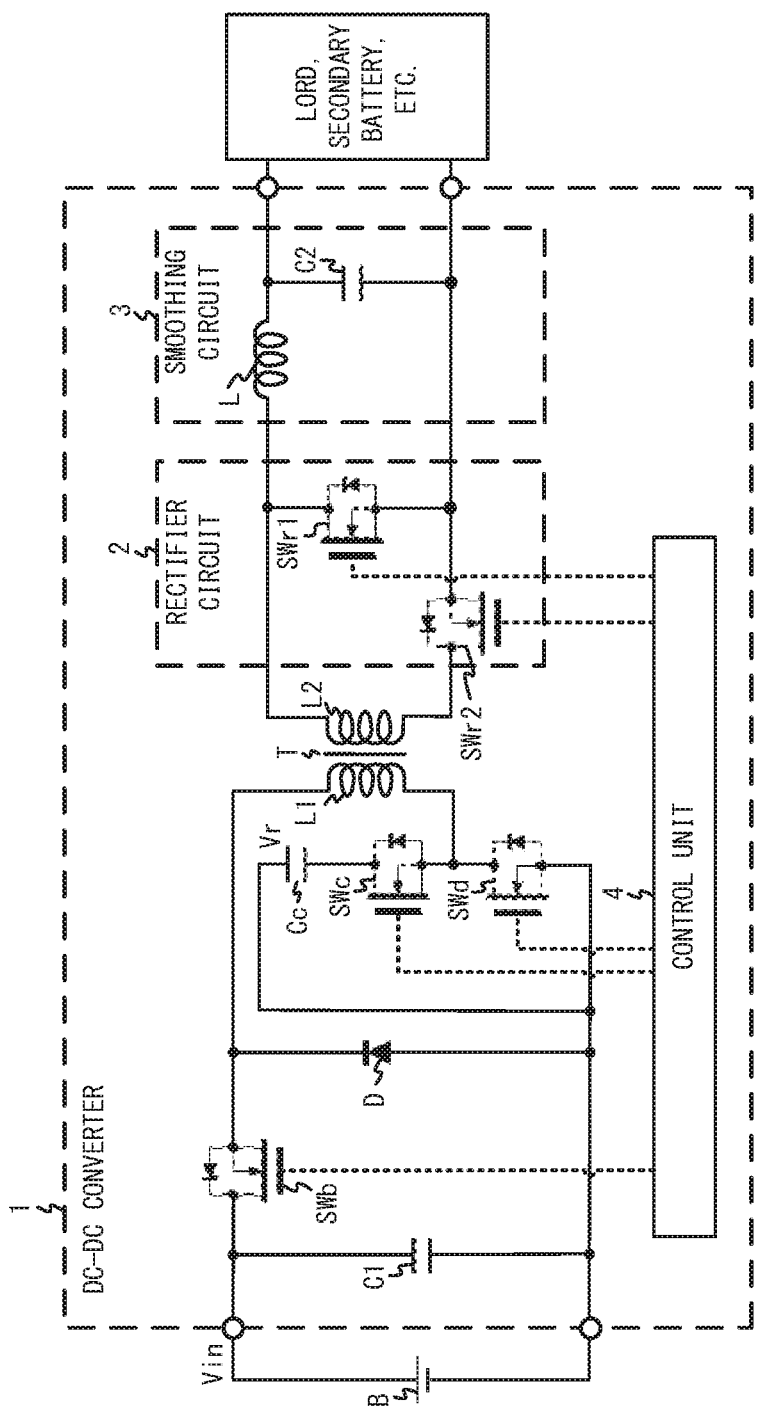
FIG. 3 illustrates an example of a DC-DC converter according to the third embodiment.

FIG. 3 illustrates an example of the DC-DC converter according to the third embodiment. Meanwhile, In the DC-DC converter 1 illustrated in FIG. 3, the same numerals are assigned to the components that are the same as those in FIG. 1, and explanation for them is omitted.

The DC-DC converter 1 illustrated in FIG. 3 differs from the DC-DC converter 1 illustrated in FIG. 1 in that a diode D is provided instead of the reset switch SWre. That is, the cathode terminal of the diode D is connected to the connection point of one of the terminal of the cutoff switch SWb and one of the terminals of the primary winding L1, and the anode terminal of the diode D is connected to the connection point of one of the terminals of the driving switch SWd and the other of the terminals (negative terminal) of the power source B. Meanwhile, it is assumed that the operations of the cutoff switch SWb, the driving switch SWd, and the clamp switch SWc illustrated in FIG. 3 are similar to the operations of the cutoff switch SWb, the driving switch SWd, and the clamp switch SWc illustrated in FIG. 1.

When the cutoff switch SWb and the driving switch SWd are switched from on to off while the clamp switch SWc are switched from off to on, after the current flows from the other of the terminals of the primary winding L1 to one of the terminals of the primary winding L1 via the clamp switch SWc, the capacitor Cc, and the diode D, the current flows from one of the terminals of the primary winding L1 to the other of the terminals of the primary winding L1 via the parasitic diode of the cutoff switch SWb, the capacitor C1, the capacitor Cc, and the clamp switch SWc, discharging the energy stored in the primary winding L1 while the cutoff switch SWb and the driving switch SWd were on. Meanwhile, it is assumed that the voltage Vr is applied to the capacitor Cc when the cutoff switch SWb and the driving switch SWd are off while the clamp switch SWc is on.

In the DC-DC converter 1 of the third embodiment, when the cutoff switch SWb and the driving switch SWd are switched from on to off, the clamp switch SWc are switched from off to on, the voltage Vr applied to the capacitor Cc is applied to the driving switch SWd, and the input voltage Vin that is the voltage of the power source B is applied to the cutoff switch SWb. Meanwhile, when the cutoff switch SWb and the driving switch SWd are switched from off to on and the clamp switch SWc are switched from on to off, the voltage Vr is applied to the clamp switch SWc. Thus, it is possible not to apply the total voltage of the input voltage Vin and the voltage Vr applied to the capacitor Cc to the cutoff switch SWb, the driving switch SWd, and the clamp switch SWc, it is possible to suppress the withstand voltages of the cutoff switch SWb, the driving switch SWd, and the clamp switch SWc. For this reason, it is possible to suppress the increase in the costs and on-resistances of the cutoff switch SWb, the driving switch SWd, and the clamp switch SWc, and it is possible to suppress the increase in the production cost of the DC-DC converter 1 and decrease in the efficiency of the DC-DC converter 1.

Meanwhile, in the DC-DC converter 1 of the third embodiment, while the clamp switch SWc is on, the potential of the other of the terminals of the capacitor Cc may be clamped to the potential of the other of the terminals (negative terminal) of the power source B, and therefore, it is possible to suppress the increase in the voltage applied to the capacitor Cc when the cutoff switch SWb and the driving switch SWd are switched from on to off, and it is possible to suppress the voltage applied to the driving switch SWd from turning to a negative voltage.

Fourth Embodiment

Figure 4:
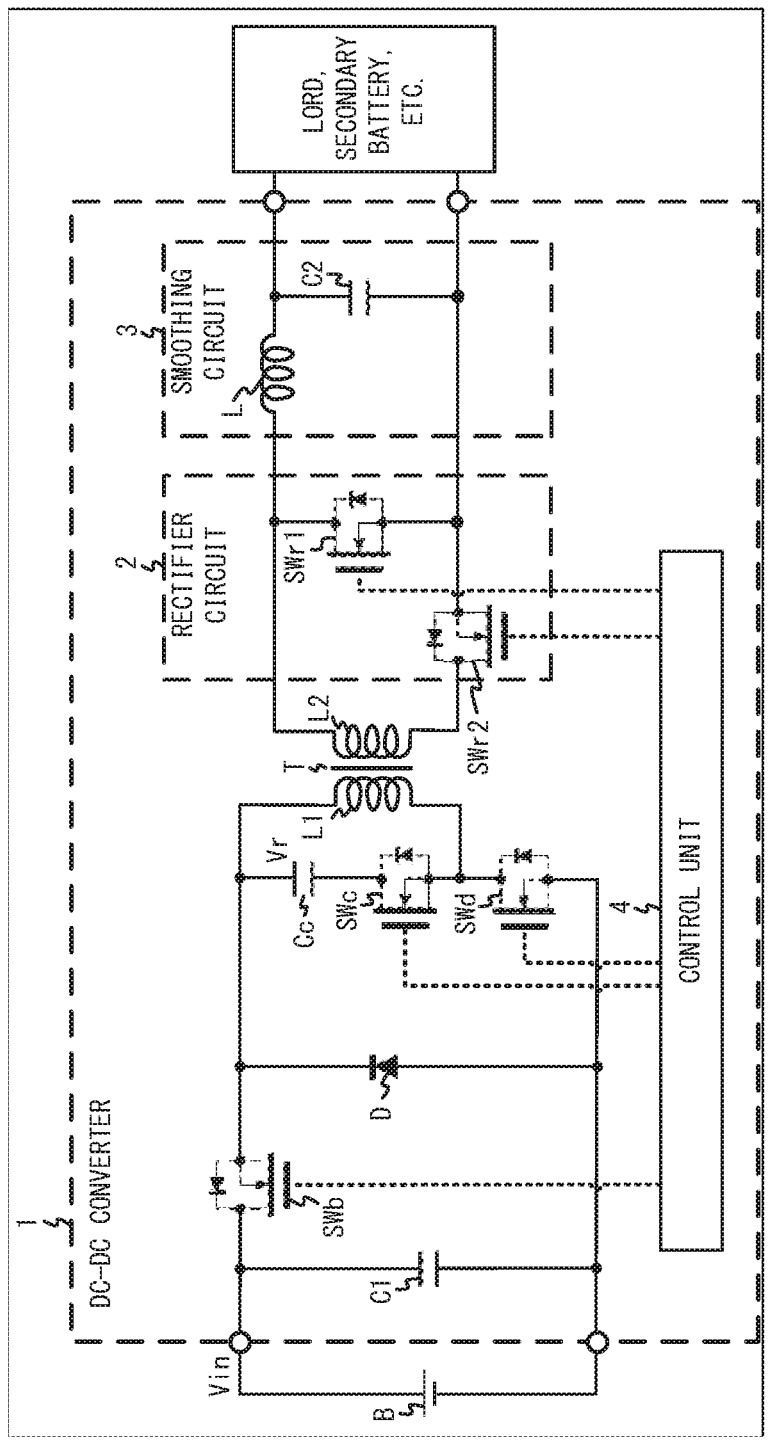
FIG. 4 illustrates an example of a DC-DC converter according to the fourth embodiment.

FIG. 4 illustrates an example of the DC-DC converter according to the fourth embodiment. Meanwhile, In the DC-DC converter 1 illustrated in FIG. 4, the same numerals are assigned to the components that are the same as those in FIG. 1, and explanation for them is omitted.

In the DC-DC converter 1 illustrated in FIG. 4 differs from the DC-DC converter 1 illustrated in FIG. 1 in that a diode D is provided instead of the reset switch SWre, the other of the terminals of the capacitor Cc is connected not to the other of the terminals (negative terminal) of the power source B but to the connection point of the cathode terminal of the diode D and one of the terminals of the primary winding L1. Meanwhile, it is assumed that the operations of the cutoff switch SWb, the driving switch SWd, and the clamp switch SWc illustrated in FIG. 4 are similar to the operations of the cutoff switch SWb, the driving switch SWd, and the clamp switch SWc illustrated in FIG. 1.

When the cutoff switch SWb and the driving switch SWd are switched from on to off while the clamp switch SWc are switched from off to on, after the current flows from the other of the terminals of the primary winding L1 to one of the terminals of the primary winding L1 via the clamp switch SWc and the capacitor Cc, the current flows from one of the terminals of the primary winding L1 to the other of the terminals of the primary winding L1 via the capacitor Cc and the clamp switch SWc, discharging the energy stored in the primary winding L1 while the cutoff switch SWb and the driving switch SWd is on. In addition, it is assumed that the voltage Vr is applied to the capacitor Cc when the cutoff switch SWb and the driving switch SWd are off while the clamp switch SWc is on.

In the DC-DC converter 1 of the fourth embodiment, when the cutoff switch SWb and the driving switch SWd are switched from on to off and the clamp switch SWc are switched from off to on, the voltage Vr applied to the capacitor Cc is applied to the driving switch SWd, and the input voltage Vin that is the voltage of the power source B is applied to the cutoff switch SWb. Meanwhile, when the cutoff switch SWb and the driving switch SWd are switched from off to on and the clamp switch SWc are switched from on to off, the voltage Vr is applied to the clamp switch SWc. Thus, it is possible not to apply the total voltage of the input voltage Vin and the voltage Vr applied to the capacitor Cc to the cutoff switch SWb, the driving switch SWd, and the clamp switch SWc, it is possible to suppress the withstand voltages of the cutoff switch SWb, the driving switch SWd, and the clamp switch SWc. For this reason, it is possible to suppress the increase in the costs and on-resistances of the cutoff switch SWb, the driving switch SWd, and the clamp switch SWc, and it is possible to suppress the increase in the production cost of the DC-DC converter 1 and decrease in the efficiency of the DC-DC converter 1.

Meanwhile, in the DC-DC converter 1 of the fourth embodiment, while the clamp switch SWc is on, it is possible to clamp the potential of the other of the terminals of the capacitor Cc to the potential of the other of the terminals (negative terminal) of the power source B by the diode D, it is possible to suppress the increase in the voltage applied to the capacitor Cc, and it is possible to suppress the voltage applied to the driving switch SWd from turning to a negative voltage when the cutoff switch SWb and the driving switch SWd are switched from on to off.

Fifth Embodiment

Figure 5:
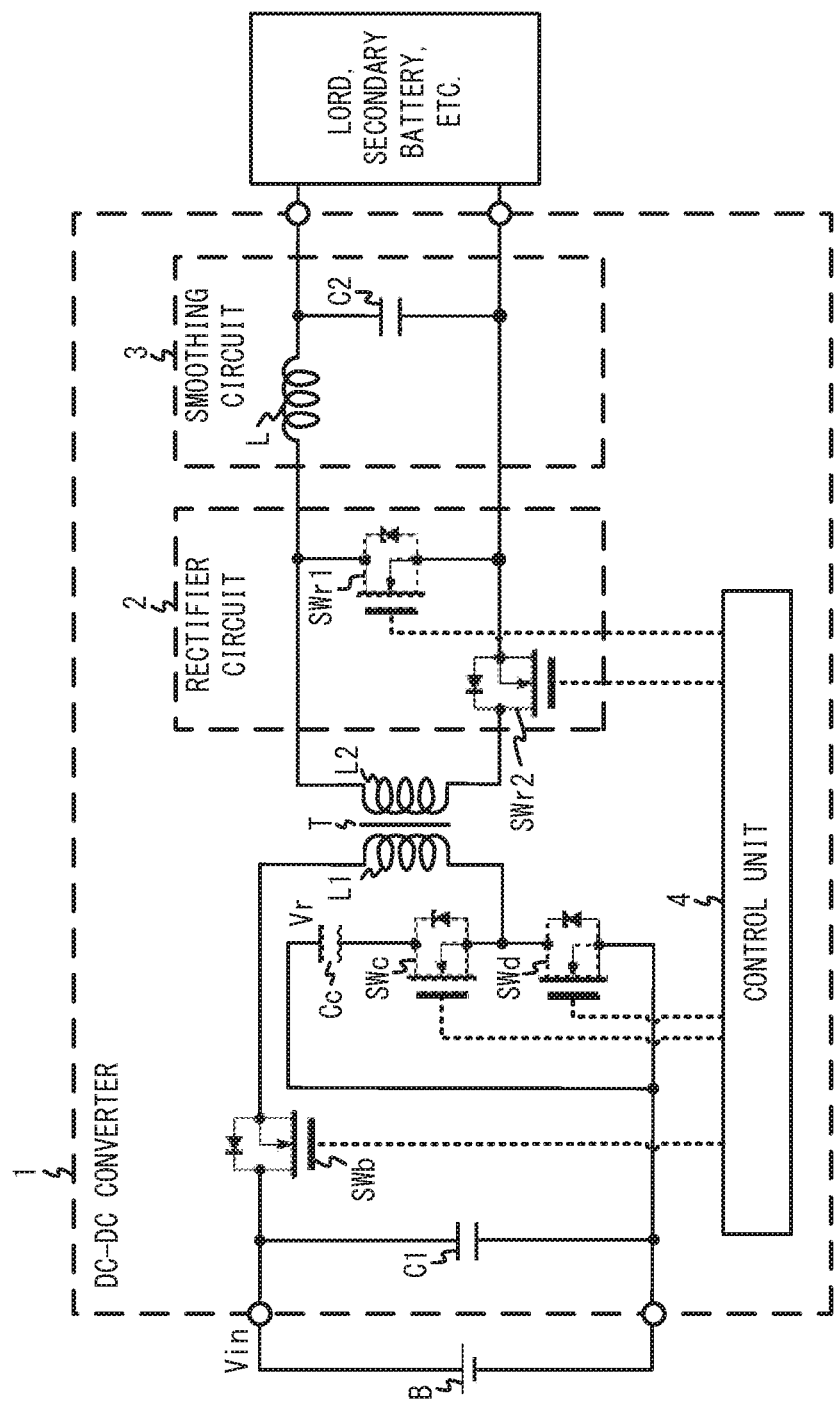
FIG. 5 illustrates an example of a DC-DC converter according to the fifth embodiment.

FIG. 5 illustrates an example of the DC-DC converter according to the fifth embodiment. Meanwhile, In the DC-DC converter 1 illustrated in FIG. 5, the same numerals are assigned to the components that are the same as those in FIG. 1, and explanation for them is omitted.

In the DC-DC converter 1 illustrated in FIG. 5 differs from the DC-DC converter 1 illustrated in FIG. 1 in that the reset switch SWre is omitted. Meanwhile, it is assumed that the operations of the cutoff switch SWb, the driving switch SWd, and the clamp switch SWc illustrated in FIG. 5 are similar to the operations of the cutoff switch SWb, the driving switch SWd, and the clamp switch SWc illustrated in FIG. 1.

When the cutoff switch SWb and the driving switch SWd are switched from on to off while the clamp switch SWc are switched from off to on, the current flows from one of the terminals of the primary winding L1 to the other of the terminals of the primary winding L1 via the parasitic diode of the cutoff switch SWb, the capacitor C1, the capacitor Cc, and the clamp switch SWc, discharging the energy stored in the primary winding L1 while the cutoff switch SWb and the driving switch SWd were on. Meanwhile, it is assumed that the voltage Vr is applied to the capacitor Cc when the cutoff switch SWb and the driving switch SWd are off while the clamp switch SWc is on.

In the DC-DC converter 1 of the fifth embodiment, when the cutoff switch SWb and the driving switch SWd are switched from on to off and the clamp switch SWc are switched from off to on, the voltage Vr applied to the capacitor Cc is applied to the driving switch SWd, and the input voltage Vin that is the voltage of the power source B is applied to the cutoff switch SWb. Meanwhile, when the cutoff switch SWb and the driving switch SWd are switched from off to on and the clamp switch SWc are switched from on to off, the voltage Vr is applied to the clamp switch SWc. Thus, it is possible not to apply the total voltage of the input voltage Vin and the voltage Vr applied to the capacitor Cc to the cutoff switch SWb, the driving switch SWd, and the clamp switch SWc, and therefore, it is possible to suppress the withstand voltages of the cutoff switch SWb, the driving switch SWd, and the clamp switch SWc. For this reason, it is possible to suppress the increase in the costs and on-resistances of the cutoff switch SWb, the driving switch SWd, and the clamp switch SWc, and it is possible to suppress the increase in the production cost of the DC-DC converter 1 and decrease in the efficiency of the DC-DC converter 1.

Meanwhile, in the DC-DC converter 1 of the fifth embodiment, while the clamp switch SWc is on, the potential of the other of the terminals of the capacitor Cc may be clamped to the potential of the other of the terminals (negative terminal) of the power source B, and therefore, it is possible to suppress the increase in the voltage applied to the capacitor Cc, and it is possible to suppress the voltage applied to the driving switch SWd from turning to a negative voltage when the cutoff switch SWb and the driving switch SWd are switched from on to off.

Sixth Embodiment

FIG. 6 illustrates an example of the DC-DC converter according to the sixth embodiment. Meanwhile, in the DC-DC converter 1 illustrated in FIG. 6, the same numerals are assigned to the components that are the same as those in FIG. 1, and explanation for them is omitted.

In the DC-DC converter 1 illustrated in FIG. 6 differs from the DC-DC converter 1 illustrated in FIG. 1 in that the reset switch SWre is omitted, and the other of the terminals of the capacitor Cc is connected not to the other of the terminals (negative terminal) of the power source B but to the connection point of one of the terminals of the cutoff switch SWb and one of the terminals of the primary winding L1. Meanwhile, it is assumed that the operations of the cutoff switch SWb, the driving switch SWd, and the clamp switch SWc illustrated in FIG. 6 are similar to the operations of the cutoff switch SWb, the driving switch SWd, and the clamp switch SWc illustrated in FIG. 1.

When the cutoff switch SWb and the driving switch SWd are switched from on to off while the clamp switch SWc are switched from off to on, after the current flows from the other of the terminals of the primary winding L1 to one of the terminals of the primary winding L1 via the clamp switch SWc and the capacitor Cc, the current flows from one of the terminals of the primary winding L1 to the other of the terminals of the primary winding L1 via the capacitor Cc and the clamp switch SWc, discharging the energy stored in the primary winding L1 while the cutoff switch SWb and the driving switch SWd were on. Meanwhile, it is assumed that the voltage Vr is applied to the capacitor Cc when the cutoff switch SWb and the driving switch SWd are off while the clamp switch SWc is on.

In the DC-DC converter 1 of the sixth embodiment, the cutoff switch SWb and the driving switch SWd are switched from on to off, the clamp switch SWc are switched from off to on, the voltage Vr applied to the capacitor Cc is applied to the driving switch SWd, and the input voltage Vin that is the voltage of the power source B is applied to the cutoff switch SWb. Meanwhile, when the cutoff switch SWb and the driving switch SWd are switched from off to on and the clamp switch SWc are switched from on to off, the voltage Vr is applied to the clamp switch SWc. Thus, it is possible not to apply the total voltage of the input voltage Vin and the voltage Vr applied to the capacitor Cc to the cutoff switch SWb, the driving switch SWd, and the clamp switch SWc, and therefore, it is possible to suppress the withstand voltages of the cutoff switch SWb, the driving switch SWd, and the clamp switch SWc. For this reason, it is possible to suppress the increase in the costs and on-resistances of the cutoff switch SWb, the driving switch SWd, and the clamp switch SWc, and it is possible to suppress the increase in the production cost of the DC-DC converter 1 and decrease in the efficiency of the DC-DC converter 1.

Seventh Embodiment

FIG. 7 illustrates an example of the DC-DC converter according to the seventh embodiment. Meanwhile, In the DC-DC converter 1 illustrated in FIG. 7, the same numerals are assigned to the components that are the same as those in FIG. 1, and explanation for them is omitted.

The DC-DC converter 1 illustrated in FIG. 7 differs from the DC-DC converter 1 illustrated in FIG. 1 in that the reset switch SWre, the clamp switch SWc, and the capacitor Cc are omitted, and a reset circuit Re is connected to the both ends of the driving switch SWd. Meanwhile, it is assumed that the operations of the cutoff switch SWb and the driving switch SWd illustrated in FIG. 7 are similar to the operations of the cutoff switch SWb and the driving switch SWd illustrated in FIG. 1.

In the DC-DC converter 1 of the seventh embodiment, when the cutoff switch SWb and the driving switch SWd are switched from on to off, the input voltage Vin that is the voltage of the power source B is applied to the cutoff switch SWb, and the input voltage Vin is not applied to the driving switch SWd. Thus, it is possible to limit the voltage applied to the cutoff switch SWb to only the voltage of the power source B while not including the voltage of the power source B in the voltage applied to the driving switch SWd, and therefore, it is possible to suppress the withstand voltages of the cutoff switch SWb and the driving switch SWd. For this reason, it is possible to suppress the increase in the costs and the on-resistances of the cutoff switch SWb and the driving switch SWd, and it is possible to suppress the increase in the production cost of the DC-DC converter 1 and decrease in the efficiency of the DC-DC converter 1.

Eighth Embodiment

Figure 8:
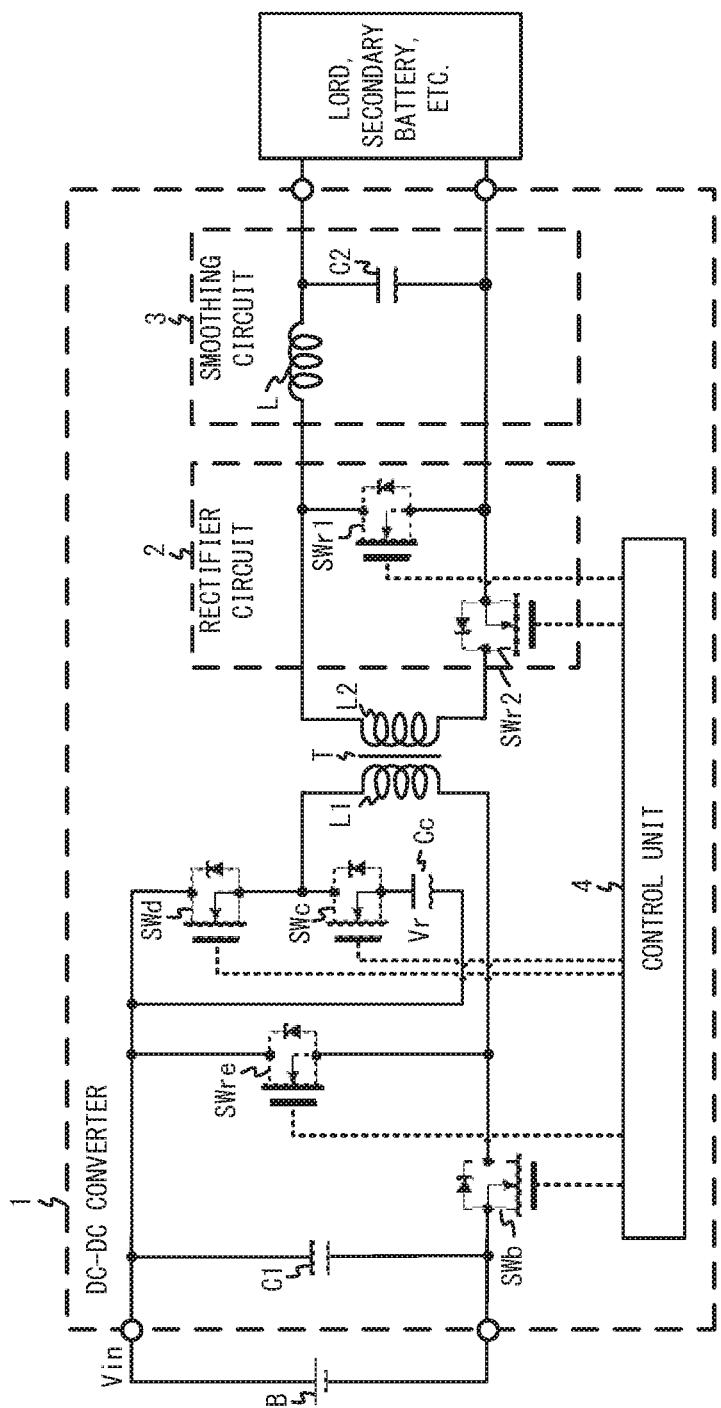
FIG. 8 illustrates an example of a DC-DC converter according to the eighth embodiment.

FIG. 8 illustrates an example of the DC-DC converter according to the eighth embodiment. Meanwhile, In the DC-DC converter 1 illustrated in FIG. 8, the same numerals are assigned to the components that are the same as those in FIG. 1, and explanation for them is omitted.

The DC-DC converter 1 illustrated in FIG. 8 differs from the DC-DC converter 1 illustrated in FIG. 1 in that, between the power source B and the primary winding L1, the components provided in the positive side of the power source B and the components provided in the negative side of the power source B are replaced with each other.

That is, one of the terminals (drain terminal) of the cutoff switch SWb is connected to one of the terminals of the primary winding L1 of the transformer T, and the other of the terminals (source terminal) of the cutoff switch SWb is connected to the one of the terminals (negative terminal) of the power source B. One of the terminals (drain terminal) of the driving switch SWd is connected to the other of the terminals (positive terminal) of the power source B, and the other of the terminals (source terminal) of the driving switch SWd is connected to the other of the terminals of the primary winding L1. One of the terminals (source terminal) of the reset switch SWre is connected to the connection point of one of the terminals of the cutoff switch SWb and one of the terminals of the primary winding L1, and the other of the terminals (drain terminal) of the reset switch SWre is connected to the connection point of one of the terminals of the driving switch SWd and the other of the terminals of the power source B. One of the terminals (drain terminal) of the clamp switch SWc is connected to the connection point of the other of the terminals of the primary winding L1 and the other of the terminals of the driving switch SWd. One of the terminals of the capacitor Cc is connected to the other of the terminals of the clamp switch SWc, and the other of the terminals of the capacitor Cc is connected to the connection point of the other of the terminals of the reset switch SWre and one of the terminals of the driving switch SWd. Meanwhile, it is assumed that operations of the cutoff switch SWb, the driving switch SWd, the reset switch SWre, and the clamp switch SWc illustrated in FIG. 8 are similar to the operations of the cutoff switch SWb, the driving switch SWd, the reset switch SWre, and the clamp switch SWc illustrated in FIG. 1.

When the cutoff switch SWb and the driving switch SWd are switched from on to off while the reset switch SWre and the clamp switch SWc are switched from off to on, after the current flows from one of the terminals of the primary winding L1 to the other of the terminals of the primary winding L1 via the reset switch SWre, the capacitor Cc, the clamp switch SWc, the current flows from the other of the terminals of the primary winding L1 to one of the terminals of the primary winding L1 via the clamp switch SWc, the capacitor Cc, and the reset switch SWre, discharging the energy stored in the primary winding L1 while the cutoff switch SWb and the driving switch SWd were on. Meanwhile, it is assumed that the voltage Vr is applied to the capacitor Cc when the cutoff switch SWb and the driving switch SWd are off while the reset switch SWre and the clamp switch SWc are on.

In the DC-DC converter 1 of the eighth embodiment, when the cutoff switch SWb and the driving switch SWd are switched from on to off and the reset switch SWre and the clamp switch SWc are switched from off to on, the voltage Vr applied to the capacitor Cc is applied to the driving switch SWd, and the input voltage Vin that is the voltage of the power source B is applied to the cutoff switch SWb. Meanwhile, when the cutoff switch SWb and the driving switch SWd are switched from off to on and the reset switch SWre and the clamp switch SWc are switched from on to off, the voltage Vr is applied to the clamp switch SWc, and the input voltage Vin is applied to the reset switch SWre. Thus, it is possible not to apply the total voltage of the input voltage Vin and the voltage Vr applied to the capacitor Cc to the cutoff switch SWb, the driving switch SWd, the reset switch SWre, and the clamp switch SWc, and therefore, it is possible to suppress the withstand voltages of the cutoff switch SWb, the driving switch SWd, the reset switch SWre, and the clamp switch SWc. For this reason, it is possible to suppress the increase in the costs and on-resistances of the cutoff switch SWb, the driving switch SWd, the reset switch SWre, and the clamp switch SWc, and it is possible to suppress the increase in the production cost of the DC-DC converter 1 and decrease in the efficiency of the DC-DC converter 1.

Meanwhile, in the DC-DC converter 1 of the eighth embodiment, while the clamp switch SWc is on, the potential of the other of the terminals of the capacitor Cc may be clamped to the potential the other of the terminals (positive terminal) of the power source B, and therefore, it is possible to suppress the increase in the voltage applied to the capacitor Cc, and it is possible to suppress the voltage applied to the driving switch SWd from turning to a negative voltage when the cutoff switch SWb and the driving switch SWd are switched from on to off.

Ninth Embodiment

Figure 9:
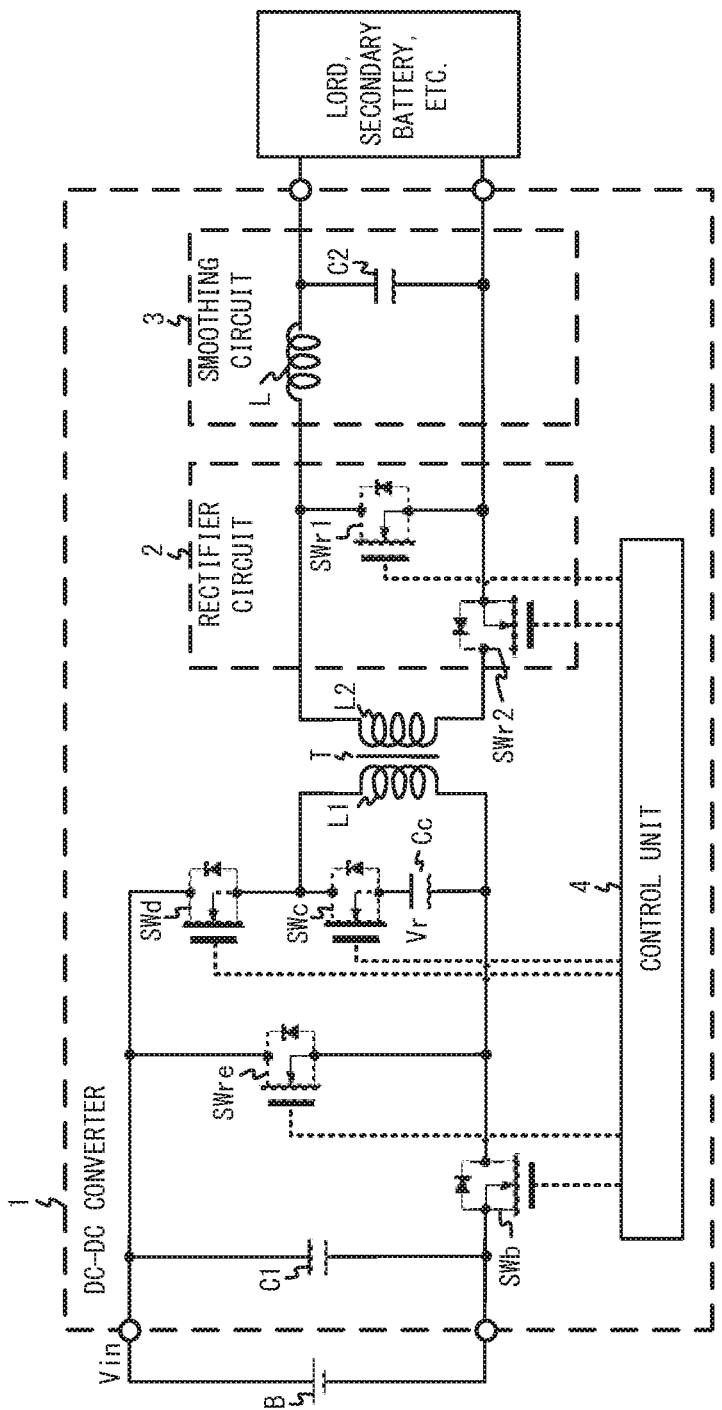
FIG. 9 illustrates an example of a DC-DC converter according to the ninth embodiment.

FIG. 9 illustrates an example of the DC-DC converter according to the ninth embodiment. Meanwhile, In the DC-DC converter 1 illustrated in FIG. 9, the same numerals are assigned to the components that are the same as those in FIG. 8, and explanation for them is omitted.

The DC-DC converter 1 illustrated in FIG. 9 differs from the DC-DC converter 1 illustrated in FIG. 8 in that the other of the terminals of the capacitor CC is connected not to the other of the terminals (positive terminal) of the power source B but to the connection point of one of the terminals of the reset switch SWre and one of the terminals of the primary winding L1. Meanwhile, it is assumed that the operations of the cutoff switch SWb, the driving switch SWd, the reset switch SWre, and the clamp switch SWc illustrated in FIG. 9 are similar to the operations of the cutoff switch SWb, the driving switch SWd, the reset switch SWre, and the clamp switch SWc illustrated in FIG. 8.

When the cutoff switch SWb and the driving switch SWd are switched from on to off while the reset switch SWre and the clamp switch SWc are switched from off to on, after the current flows from one of the terminals of the primary winding L1 to the other of the terminals of the primary winding L1 via the capacitor Cc and the clamp switch SWc, the current flows from the other of the terminals of the primary winding L1 to one of the terminals of the primary winding L1 via the clamp switch SWc and the capacitor Cc, discharging the energy stored in the primary winding L1 while the cutoff switch SWb and the driving switch SWd were on. Meanwhile, it is assumed that the voltage Vr is applied to the capacitor Cc when the cutoff switch SWb and the driving switch SWd are off while the reset switch SWre and the clamp switch SWc are on.

In the DC-DC converter 1 of the ninth embodiment, when the cutoff switch SWb and the driving switch SWd are switched from on to off and the reset switch SWre and the clamp switch SWc are switched from off to on, the voltage Vr applied to the capacitor Cc is applied to the driving switch SWd, and the input voltage Vin that is the voltage of the power source B is applied to the cutoff switch SWb. Meanwhile, when the cutoff switch SWb and the driving switch SWd are switched from off to on and the reset switch SWre and the clamp switch SWc are switched from on to off, the voltage Vr is applied to the clamp switch SWc, and the input voltage Vin is applied to the reset switch SWre. Thus, it is possible not to apply the total voltage of the input voltage Vin and the voltage Vr applied to the capacitor Cc to the cutoff switch SWb, the driving switch SWd, the reset switch SWre, and the clamp switch SWc, and therefore, it is possible to suppress the withstand voltages of the cutoff switch SWb, the driving switch SWd, the reset switch SWre, and the clamp switch SWc. For this reason, it is possible to suppress the increase in the costs and on-resistances of the cutoff switch SWb, the driving switch SWd, the reset switch SWre, and the clamp switch SWc, and it is possible to suppress the increase in the production cost of the DC-DC converter 1 and decrease in the efficiency of the DC-DC converter 1.

Meanwhile, in the DC-DC converter 1 of the ninth embodiment, while the reset switch SWre and the clamp switch SWc are on, the potential of the other of the terminals of the capacitor Cc may be clamped to the potential of the other of the terminals (positive terminal) of the power source B by the reset switch SWre, and therefore, it is possible to suppress the increase in the voltage applied to the capacitor Cc, and it is possible to suppress the voltage applied to the driving switch SWd from turning to a negative voltage when the cutoff switch SWb and the driving switch SWd are switched from on to off.

Tenth Embodiment

Figure 10:
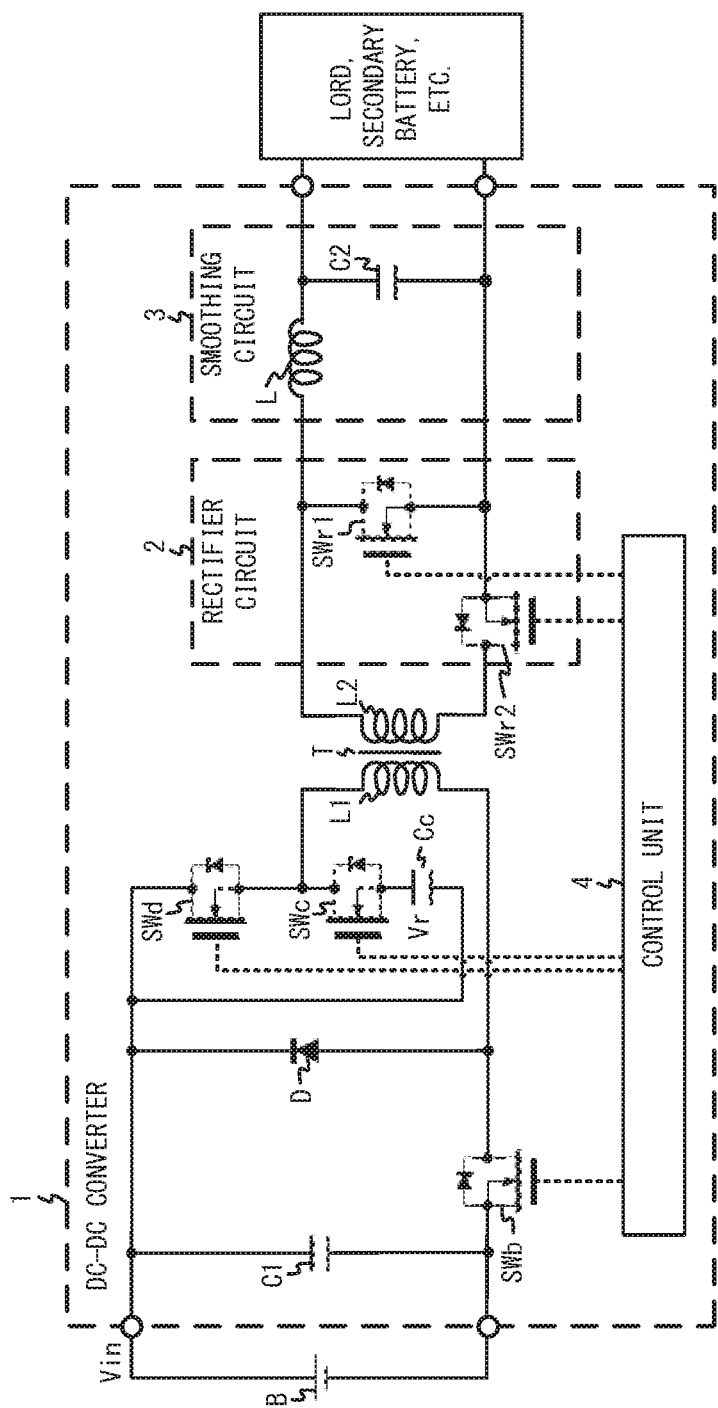
FIG. 10 illustrates an example of a DC-DC converter according to the tenth embodiment.

FIG. 10 illustrates an example of the DC-DC converter according to the tenth embodiment. Meanwhile, In the DC-DC converter 1 illustrated in FIG. 10, the same numerals are assigned to the components that are the same as those in FIG. 8, and explanation for them is omitted.

The DC-DC converter 1 illustrated in FIG. 10 differs from the DC-DC converter 1 illustrated in FIG. 8 in that a diode D is provide instead of the reset switch SWre. That is, the cathode terminal of the diode D is connected to the connection point of the other of the terminals (positive terminal) of the power source B and one of the terminals of the driving switch SWd, the anode terminal of the diode D is connected to the connection point of one of the terminals of the cutoff switch SWb and one of the terminals of the primary winding L1. Meanwhile, it is assumed that the operations of the cutoff switch SWb, the driving switch SWd, and the clamp switch SWc illustrated in FIG. 10 are similar to the operations of the cutoff switch SWb, the driving switch SWd, and the clamp switch SWc illustrated in FIG. 8.

When the cutoff switch SWb and the driving switch SWd are switched from on to off while the clamp switch SWc are switched from off to on, after the current flows from one of the terminals of the primary winding L1 to the other of the terminals of the primary winding L1 via the diode D, the capacitor Cc, and the clamp switch SWc, the current flows from the other of the terminals of the primary winding L1 to one of the terminals of the primary winding L1 via the clamp switch SWc, the capacitor Cc, the capacitor C1, and the parasitic diode of the cutoff switch SWb, discharging the energy stored in primary winding L1 while the cutoff switch SWb and the driving switch SWd were on. Meanwhile, it is assumed that the voltage Vr is applied to the capacitor Cc when the cutoff switch SWb and the driving switch SWd are off while the clamp switch SWc is on.

In the DC-DC converter 1 according to the tenth embodiment, when the cutoff switch SWb and the driving switch SWd are switched from on to off and the clamp switch SWc are switched from off to on, the voltage Vr applied to the capacitor Cc is applied to the driving switch SWd, and the input voltage Vin that is the voltage of the power source B is applied to the cutoff switch SWb. Meanwhile, when the cutoff switch SWb and the driving switch SWd are switched from off to on and the clamp switch SWc are switched from on to off, the voltage Vr is applied to the clamp switch SWc. Thus, it is possible not to apply the total voltage of the input voltage Vin and the voltage Vr applied to the capacitor Cc to the cutoff switch SWb, the driving switch SWd, and the clamp switch SWc, and therefore, it is possible to suppress the withstand voltages of the cutoff switch SWb, the driving switch SWd, and the clamp switch SWc. For this reason, it is possible to suppress the increase in the costs and on-resistances of the cutoff switch SWb, the driving switch SWd, and the clamp switch SWc, and it is possible to suppress the increase in the production cost of the DC-DC converter 1 and decrease in the efficiency of the DC-DC converter 1.

Meanwhile, in the DC-DC converter 1 of the tenth embodiment, while the clamp switch SWc is on, the potential of the other of the terminals of the capacitor Cc may be clamped to the potential of the other of the terminals (positive terminal) of the power source B, and therefore, it is possible to suppress the increase in the voltage applied to the capacitor Cc, and it is possible to prevent the voltage applied to the cutoff switch SWb from turning to the negative voltage when the cutoff switch SWb and the driving switch SWd are switched from on to off.

Eleventh Embodiment

Figure 11:
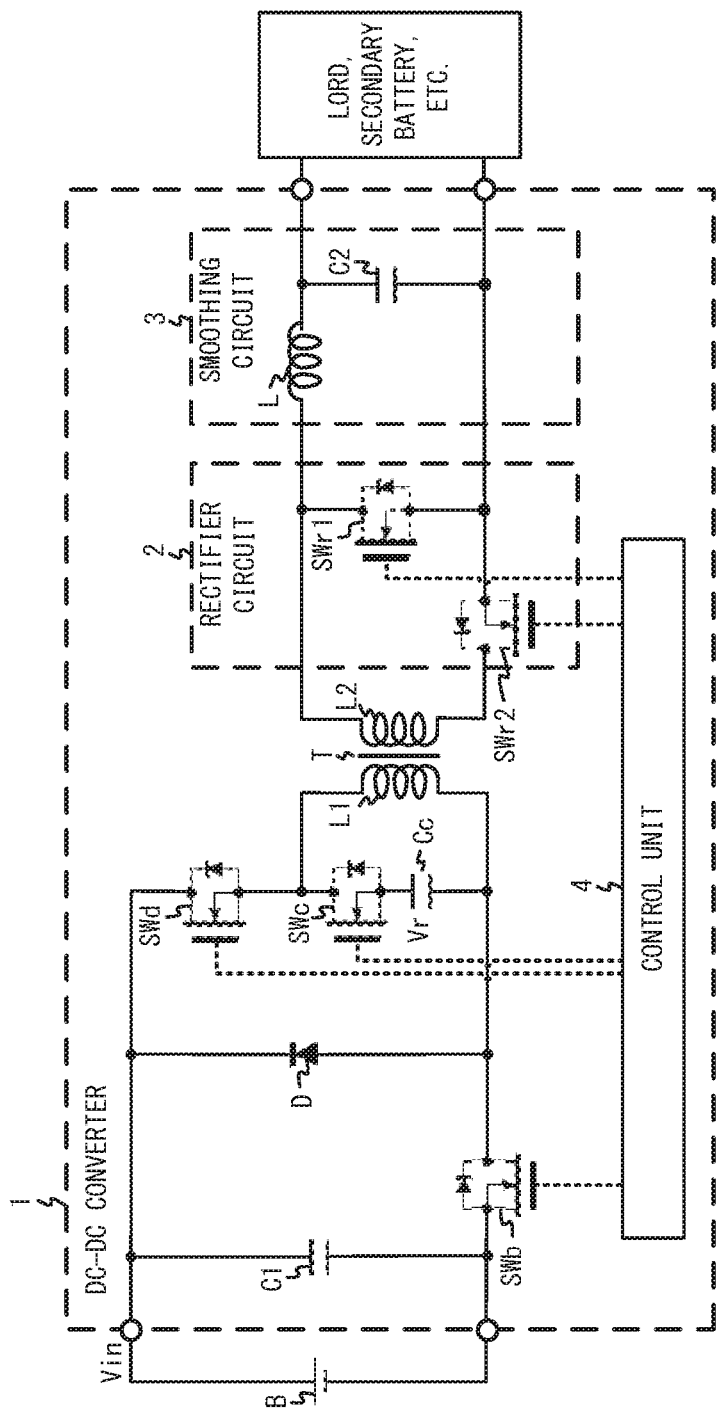
FIG. 11 illustrates an example of a DC-DC converter according to the eleventh embodiment.

FIG. 11 illustrates an example of the DC-DC converter according to the eleventh embodiment. Meanwhile, In the DC-DC converter 1 illustrated in FIG. 11, the same numerals are assigned to the components that are the same as those in FIG. 8, and explanation for them is omitted.

The DC-DC converter 1 illustrated in FIG. 11 differs from the DC-DC converter 1 illustrated in FIG. 8 in that a diode D is provided instead of the reset switch SWre, and the other of the terminals of the capacitor Cc is connected not to the other of the terminals (positive terminal) of the power source B but to the anode terminal of the diode D and one of the terminals of the primary winding L1. Meanwhile, it is assumed that the operations of the cutoff switch SWb, the driving switch SWd, and the clamp switch SWc illustrated in FIG. 11 are similar to the operations of the cutoff switch SWb, the driving switch SWd, and the clamp switch SWc illustrated in FIG. 8.

When the cutoff switch SWb and the driving switch SWd are switched from on to off while the clamp switch SWc are switched from off to on, after the current flows from one of the terminals of the primary winding L1 to the other of the terminals of the primary winding L1 via the capacitor Cc and the clamp switch SWc, the current flows from the other of the terminals of the primary winding L1 to one of the terminals of the primary winding L1 via the clamp switch SWc and the capacitor Cc, discharging the energy stored in the primary winding L1 while the cutoff switch SWb and the driving switch SWd were on. Meanwhile, it is assumed that the voltage Vr is applied to the capacitor Cc when the cutoff switch SWb and the driving switch SWd are off while the clamp switch SWc is on.

In the DC-DC converter 1 of the eleventh embodiment, when the cutoff switch SWb and the driving switch SWd are switched from on to off and the clamp switch SWc are switched from off to on, the voltage Vr applied to the capacitor Cc is applied to the driving switch SWd, and the input voltage Vin that is the voltage of the power source B is applied to the cutoff switch SWb. Meanwhile, when the cutoff switch SWb and the driving switch SWd are switched from off to on and the clamp switch SWc are switched from on to off, the voltage Vr is applied to the clamp switch SWc. Thus, it is possible not to apply the total voltage of the input voltage Vin and the voltage Vr applied to the capacitor Cc to the cutoff switch SWb, the driving switch SWd, and the clamp switch SWc, and therefore, it is possible to suppress the withstand voltages of the cutoff switch SWb, the driving switch SWd, and the clamp switch SWc. For this reason, it is possible to suppress the increase in the costs and on-resistances of the cutoff switch SWb, the driving switch SWd, and the clamp switch SWc, and it is possible to suppress the increase in the production cost of the DC-DC converter 1 and decrease in the efficiency of the DC-DC converter 1.

Meanwhile, in the DC-DC converter 1 of the eleventh embodiment, while the clamp switch SWc is on, the potential of the other of the terminals of the capacitor Cc may be clamped to the potential of the other of the terminals (positive terminal) of the power source B by the diode D, and therefore, it is possible to suppress the increase in the voltage applied to the capacitor Cc, and it is possible to suppress the voltage applied to the driving switch SWd from turning to a negative voltage when the cutoff switch SWb and the driving switch SWd are switched from on to off.

Twelfth Embodiment

FIG. 12 illustrates an example of the DC-DC converter according to the twelfth embodiment. Meanwhile, in the DC-DC converter 1 illustrated in FIG. 12, the same numerals are assigned to the components that are the same as those in FIG. 8, and explanation for them is omitted.

The DC-DC converter 1 illustrated in FIG. 12 differs from the DC-DC converter 1 illustrated in FIG. 8 in that the reset switch SWre is omitted. Meanwhile, it is assumed that the operations of the cutoff switch SWb, the driving switch SWd, and the clamp switch SWc illustrated in FIG. 12 are similar to the operations of the cutoff switch SWb, the driving switch SWd, and the clamp switch SWc illustrated in FIG. 8.

When the cutoff switch SWb and the driving switch SWd are switched from on to off while the clamp switch SWc are switched from off to on, the current flows from the other of the terminals of the primary winding L1 to one of the terminals of the primary winding L1 via the clamp switch SWc, the capacitor Cc, the capacitor C1, the parasitic diode of the cutoff switch SWb, discharging the energy stored in the primary winding L1 while the cutoff switch SWb and the driving switch SWd were on. Meanwhile, it is assumed that the voltage Vr is applied to the capacitor Cc when the cutoff switch SWb and the driving switch SWd are off while the clamp switch SWc is on.

In the DC-DC converter 1 of the twelfth embodiment, when the cutoff switch SWb and the driving switch SWd are switched from on to off while the clamp switch SWc are switched from off to on, the voltage Vr applied to the capacitor Cc is applied to the driving switch SWd, and the input voltage Vin that is the voltage of the power source B is applied to the cutoff switch SWb. Meanwhile, when the cutoff switch SWb and the driving switch SWd are switched from off to on and the clamp switch SWc are switched from on to off, the voltage Vr is applied to the clamp switch SWc. Thus, it is possible not to apply the total voltage of the input voltage Vin and the voltage Vr applied to the capacitor Cc to the cutoff switch SWb, the driving switch SWd, and the clamp switch SWc, and therefore, it is possible to suppress the withstand voltages of the cutoff switch SWb, the driving switch SWd, and the clamp switch SWc. For this reason, it is possible to suppress the increase in the costs and on-resistances of the cutoff switch SWb, the driving switch SWd, and the clamp switch SWc, and it is possible to suppress the increase in the production cost of the DC-DC converter 1 and decrease in the efficiency of the DC-DC converter 1.

Meanwhile, in the DC-DC converter 1 of the twelfth embodiment, while the clamp switch SWc is on, the potential of the other of the terminals of the capacitor Cc may be clamped to potential of the other of the terminals (positive terminal) of the power source B, it is possible to suppress the increase in the voltage applied to the capacitor Cc, and it is possible to suppress the voltage applied to the driving switch SWd from turning to a negative voltage when the cutoff switch SWb and the driving switch SWd are switched from on to off.

Thirteenth Embodiment

Figure 13:
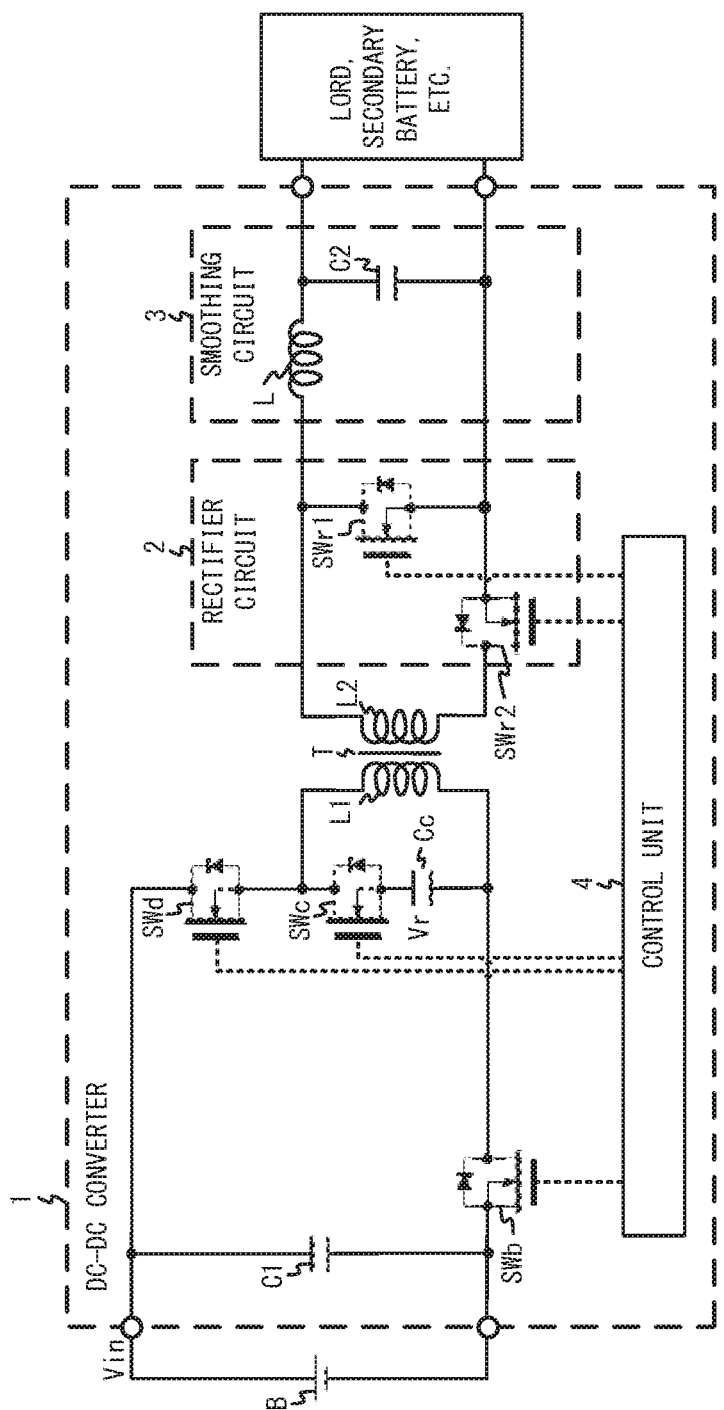
FIG. 13 illustrates an example of a DC-DC converter according to the thirteenth embodiment.

FIG. 13 illustrates an example of the DC-DC converter according to the thirteenth embodiment. Meanwhile, in the DC-DC converter 1 illustrated in FIG. 13, the same numerals are assigned to the components that are the same as those in FIG. 8, and explanation for them is omitted.

The DC-DC converter 1 illustrated in FIG. 13 differs from the DC-DC converter 1 illustrated in FIG. 8 in that the reset switch SWre is omitted, and the other of the terminals of the capacitor Cc is connected not to the other of the terminals (positive terminal) of the power source B but to the connection point of one of the terminals of the cutoff switch SWb and one of the terminals of the primary winding L1. Meanwhile, it is assumed that the operations of the cutoff switch SWb, the driving switch SWd, and the clamp switch SWc illustrated in FIG. 13 are similar to the operations of the cutoff switch SWb, the driving switch SWd, and the clamp switch SWc illustrated in FIG. 8.

When the cutoff switch SWb and the driving switch SWd are switched from on to off while the clamp switch SWc are switched from off to on, after the current flows from one of the terminals of the primary winding L1 to the other of the terminals of the primary winding L1 via the capacitor Cc and the clamp switch SWc, the current flows from the other of the terminals of the primary winding L1 to one of the terminals of the primary winding L1 via the clamp switch SWc and the capacitor Cc, discharging the energy stored in the primary winding L1 while the cutoff switch SWb and the driving switch SWd were on. Meanwhile, it is assumed that the voltage Vr is applied to the capacitor Cc when the cutoff switch SWb and the driving switch SWd are off while the clamp switch SWc is on.

In the DC-DC converter 1 of the thirteenth embodiment, when the cutoff switch SWb and the driving switch SWd are switched from on to off and the clamp switch SWc are switched from off to on, the voltage Vr applied to the capacitor Cc is applied to the driving switch SWd, and the input voltage Vin that is the voltage of the power source B is applied to the cutoff switch SWb. Meanwhile, when the cutoff switch SWb and the driving switch SWd are switched from off to on and the clamp switch SWc are switched from on to off, the voltage Vr is applied to the clamp switch SWc. Thus, it is possible not to apply the total voltage of the input voltage Vin and the voltage Vr applied to the capacitor Cc to the cutoff switch SWb, the driving switch SWd, and the clamp switch SWc, and therefore, it is possible to suppress the withstand voltages of the cutoff switch SWb, the driving switch SWd, and the clamp switch SWc. For this reason, it is possible to suppress the increase in the costs and on-resistances of the cutoff switch SWb, the driving switch SWd, and the clamp switch SWc, and it is possible to suppress the increase in the production cost of the DC-DC converter 1 and decrease in the efficiency of the DC-DC converter 1.

Fourteenth Embodiment

Figure 14:
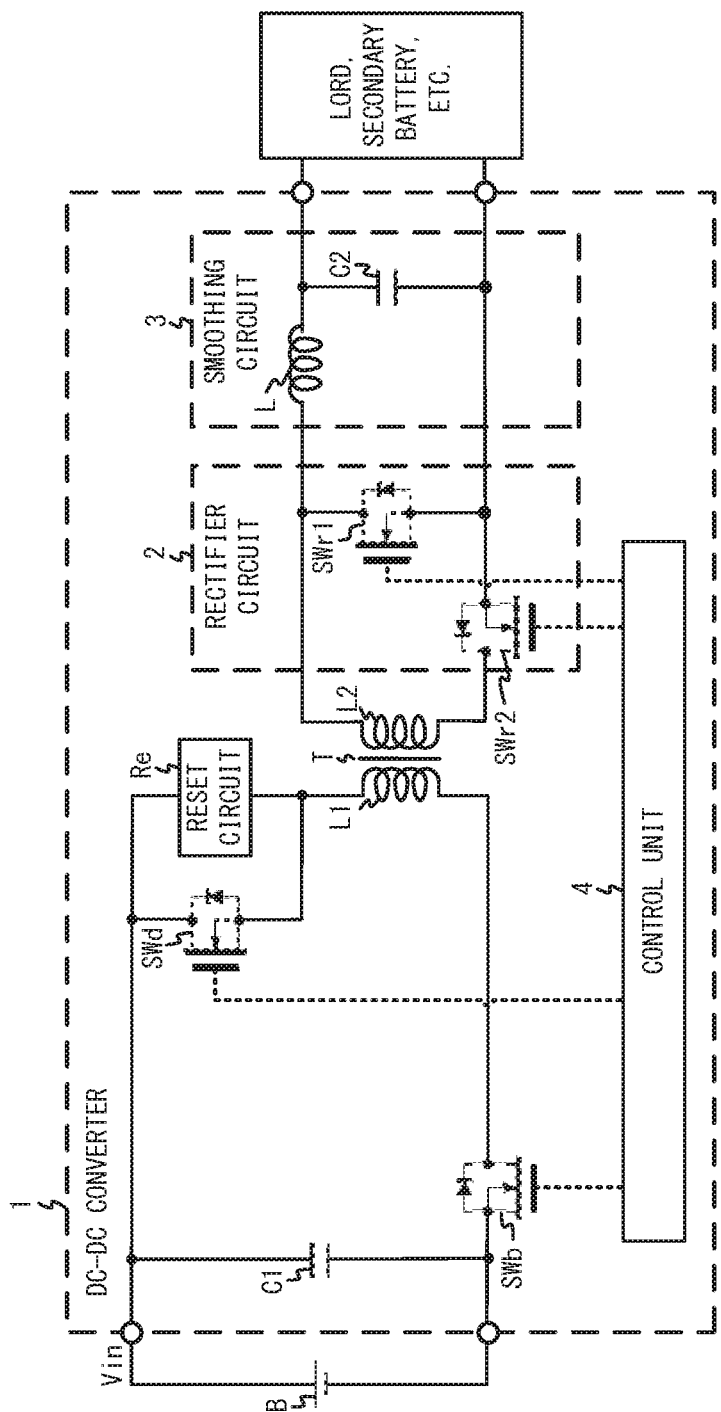
FIG. 14 illustrates an example of a DC-DC converter according to the fourteenth embodiment.

FIG. 14 illustrates an example of the DC-DC converter according to the fourteenth embodiment. Meanwhile, in the DC-DC converter 1 illustrated in FIG. 14, the same numerals are assigned to the components that are the same as those in FIG. 8, and explanation for them is omitted.

In the DC-DC converter 1 illustrated in FIG. 14 differs from the DC-DC converter 1 illustrated in FIG. 8 in that the reset switch SWre, the clamp switch SWc, and the capacitor Cc are omitted, and a reset circuit Re is connected to the both ends of the driving switch SWd. Meanwhile, it is assumed that the operations of the cutoff switch SWb and the driving switch SWd illustrated in FIG. 14 are similar to the operations of the cutoff switch SWb and the driving switch SWd illustrated in FIG. 8.

In the DC-DC converter 1 of the fourteenth embodiment 14, when the cutoff switch SWb and the driving switch SWd are switched from on to off, the input voltage Vin that is the voltage of the power source B is applied to the driving switch SWd, and the input voltage Vin is not applied to the cutoff switch SWb. Thus, it is possible to limit the voltage applied to the driving switch SWd to only the voltage of the power source B, while not including the voltage of the power source B in the voltage applied to the cutoff switch SWb, and therefore, it is possible to suppress the withstand voltages of the cutoff switch SWb and the driving switch SWd. For this reason, it is possible to suppress the increase in the costs and on-resistances of the cutoff switch SWb and the driving switch SWd, and it is possible to suppress the increase in the production cost of the DC-DC converter 1 and decrease in the efficiency of the DC-DC converter 1.

Fifteenth Embodiment

FIG. 15 illustrates an example of the DC-DC converter according to the fifteenth embodiment. Meanwhile, in the DC-DC converter 1 illustrated in FIG. 15, the same numerals are assigned to the components that are the same as those in FIG. 1, and explanation for them is omitted.

The DC-DC converter 1 illustrated in FIG. 15 differs from the DC-DC converter 1 illustrated in FIG. 1 in that the clamp switch SWc and the capacitor Cc are omitted. Meanwhile, it is assumed that the operations are similar to the operations the cutoff switch SWb, the driving switch SWd, and the reset switch SWre illustrated in FIG. 15 are similar to the operations of the cutoff switch SWb, the driving switch SWd, and the reset switch SWre illustrated in FIG. 1.

In the DC-DC converter 1 according to the fifteenth embodiment, when the cutoff switch SWb and the driving switch SWd are switched from on to off and the reset switch SWre are switched from off to on, the input voltage Vin that is the voltage of the power source B is applied to the cutoff switch SWb, and the input voltage Vin is not applied to the driving switch SWd. Meanwhile, the cutoff switch SWb and the driving switch SWd are switched from off to on, the reset switch SWre are switched from on to off, and the input voltage Vin is applied to the reset switch SWre. Thus, it is possible to limit the voltage applied to the cutoff switch SWb and the reset switch SWre only to the voltage of the power source B while not including the voltage of the power source B in the voltage applied to the driving switch SWd, and therefore, it is possible to suppress the withstand voltages of the cutoff switch SWb, the driving switch SWd, and the reset switch SWre. For this reason, it is possible to suppress the increase in the costs and on-resistances of the cutoff switch SWb, the driving switch SWd, and the reset switch SWre, and it is possible to suppress the increase in the production cost of the DC-DC converter 1 and decrease in the efficiency of the DC-DC converter 1.

Sixteenth Embodiment

FIG. 16 illustrates an example of the DC-DC converter according to the sixteenth embodiment. Meanwhile, In the DC-DC converter 1 illustrated in FIG. 16, the same numerals are assigned to the components that are the same as those in FIG. 15, and explanation for them is omitted.

In the DC-DC converter 1 illustrated in FIG. 16 differs from the DC-DC converter 1 illustrated in FIG. 15 in that the diode D is provided instead of the reset switch SWre. That is, the cathode terminal of the diode D is connected to the connection point of one of the terminals of the cutoff switch SWb and one of the terminals of the primary winding L1, and the anode terminal of the diode D is connected to the connection point of the other of the terminals (negative terminal) of the power source B and one of the terminals of the driving switch SWd. Meanwhile, it is assumed that the operations of the cutoff switch SWb and the driving switch SWd illustrated in FIG. 16 are similar to the operations of the cutoff switch SWb and the driving switch SWd illustrated in FIG. 15.

In the DC-DC converter 1 according to the sixteenth embodiment, when the cutoff switch SWb and the driving switch SWd are switched from on to off, the input voltage Vin that is the voltage of the power source B is applied to the cutoff switch SWb, and the input voltage Vin is not applied to the driving switch SWd. Thus, it is possible to limit the voltage applied to the cutoff switch SWb only to the voltage of the power source B, while not including the voltage of the power source B in the voltage applied to the driving switch SWd, and therefore, it is possible to suppress the withstand voltages of the cutoff switch SWb and the driving switch SWd. For this reason, it is possible to suppress the increase in the costs and on-resistances of the cutoff switch SWb and the driving switch SWd, and it is possible to suppress the increase in the production cost of the DC-DC converter 1 and decrease in the efficiency of the DC-DC converter 1.

Seventeenth Embodiment

FIG. 17 illustrates an example of the DC-DC converter according to the seventeenth embodiment. Meanwhile, in the DC-DC converter 1 illustrated in FIG. 17, the same numerals are assigned to the components that are the same as those in FIG. 8, and explanation for them is omitted.

In the DC-DC converter 1 illustrated in FIG. 17 differs from the DC-DC converter 1 illustrated in FIG. 8 in that the clamp switch SWc and the capacitor Cc are omitted. Meanwhile, it is assumed that the operations of the cutoff switch SWb, the driving switch SWd, and the reset switch SWre illustrated in FIG. 17 are similar to the operations of the cutoff switch SWb, the driving switch SWd, and the reset switch SWre illustrated in FIG. 8.

In the DC-DC converter 1 according to the seventeenth embodiment, when the cutoff switch SWb and the driving switch SWd are switched from on to off and the reset switch SWre are switched from off to on, the input voltage Vin that is the voltage of the power source B is applied to the cutoff switch SWb, and the input voltage Vin is not applied to the driving switch SWd. Meanwhile, when the cutoff switch SWb and the driving switch SWd are switched from off to on and the reset switch SWre are switched from on to off, the input voltage Vin is applied to the reset switch SWre. Thus, it is possible to limit the voltage applied to the cutoff switch SWb and the reset switch SWre only to the voltage of the power source B while not including the voltage of the power source B in the voltage applied to the driving switch SWd, and therefore, it is possible to suppress the withstand voltages of the cutoff switch SWb, the driving switch SWd, and the reset switch SWre. For this reason, it is possible to suppress the increase in the costs and on-resistances of the cutoff switch SWb, the driving switch SWd, and the reset switch SWre, and it is possible to suppress the increase in the production cost of the DC-DC converter 1 and decrease in the efficiency of the DC-DC converter 1.

Eighteenth Embodiment

Figure 18:
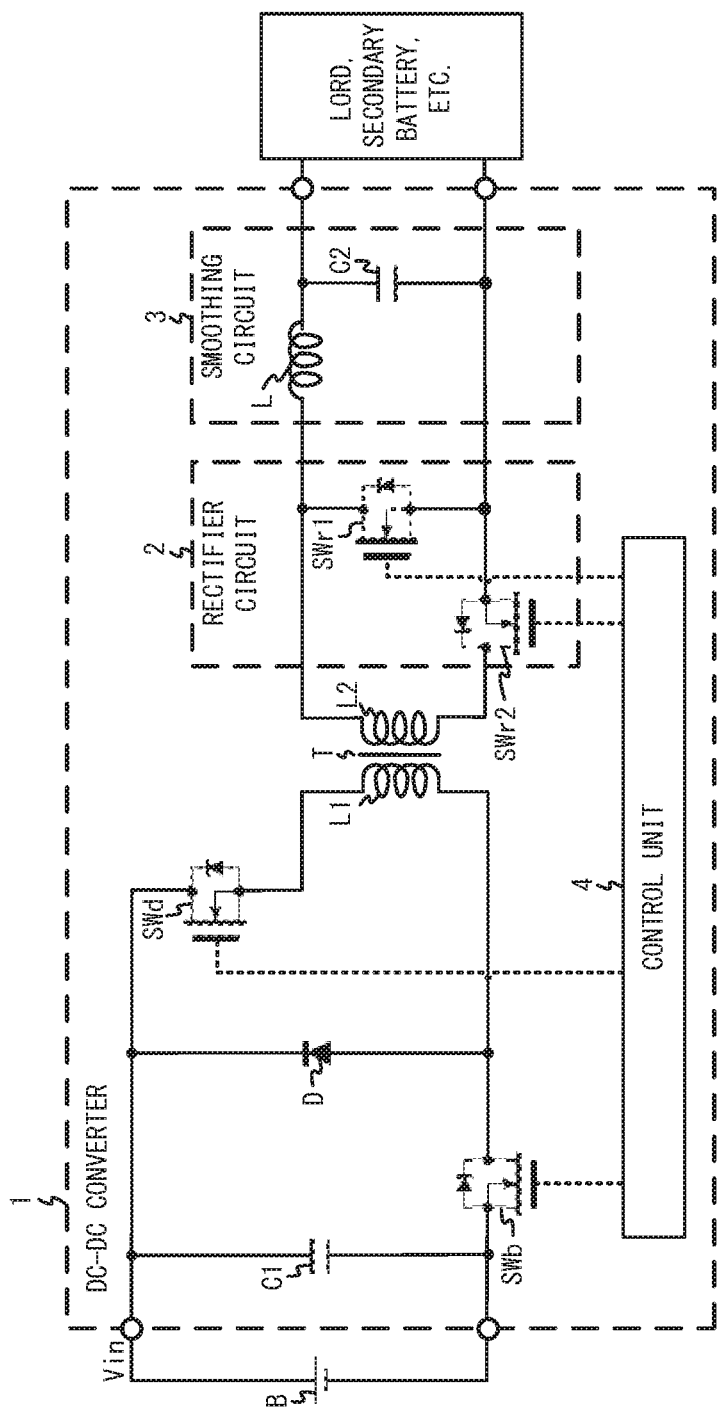
FIG. 18 illustrates an example of a DC-DC converter according to the eighteenth embodiment.

FIG. 18 illustrates an example of the DC-DC converter according to the eighteenth embodiment. Meanwhile, In the DC-DC converter 1 illustrated in FIG. 18, the same numerals are assigned to the components that are the same as those in FIG. 17, and explanation for them is omitted.

The DC-DC converter 1 illustrated in FIG. 18, differs from the DC-DC converter 1 illustrated in FIG. 17 in that a diode D is provided instead of the reset switch SWre. That is, the cathode terminal of the diode D is connected to the connection point of the other of the terminals (positive terminal) of the power source B and one of the terminals of the driving switch SWd, and the anode terminal of the diode D is connected to the connection point of one of the terminals of the cutoff switch SWb and one of the terminals of the primary winding L1. Meanwhile, it is assumed that the operations of the cutoff switch SWb and the driving switch SWd illustrated in FIG. 18 are similar to the operations of the cutoff switch SWb and the driving switch SWd illustrated in FIG. 17.

In the DC-DC converter 1 of the eighteenth embodiment, when the cutoff switch SWb and the driving switch SWd are switched from on to off, the input voltage Vin that is the voltage of the power source B is applied to the cutoff switch SWb, and the input voltage Vin is not applied to the driving switch SWd.

Thus, it is possible to limit the voltage applied to the cutoff switch SWb only to the voltage of the power source B while not including the voltage of the power source B in the voltage applied to the driving switch SWd, and therefore, it is possible to suppress the withstand voltages of the cutoff switch SWb and the driving switch SWd. For this reason, it is possible to suppress the increase in the costs and on-resistances of the cutoff switch SWb and the driving switch SWd, and it is possible to suppress the increase in the production cost of the DC-DC converter 1 and decrease in the efficiency of the DC-DC converter 1.

Meanwhile, the present invention is not limited to the embodiments above and many changes and modifications may be made without departing from the without departing from the scope of the invention.

Figure 19:
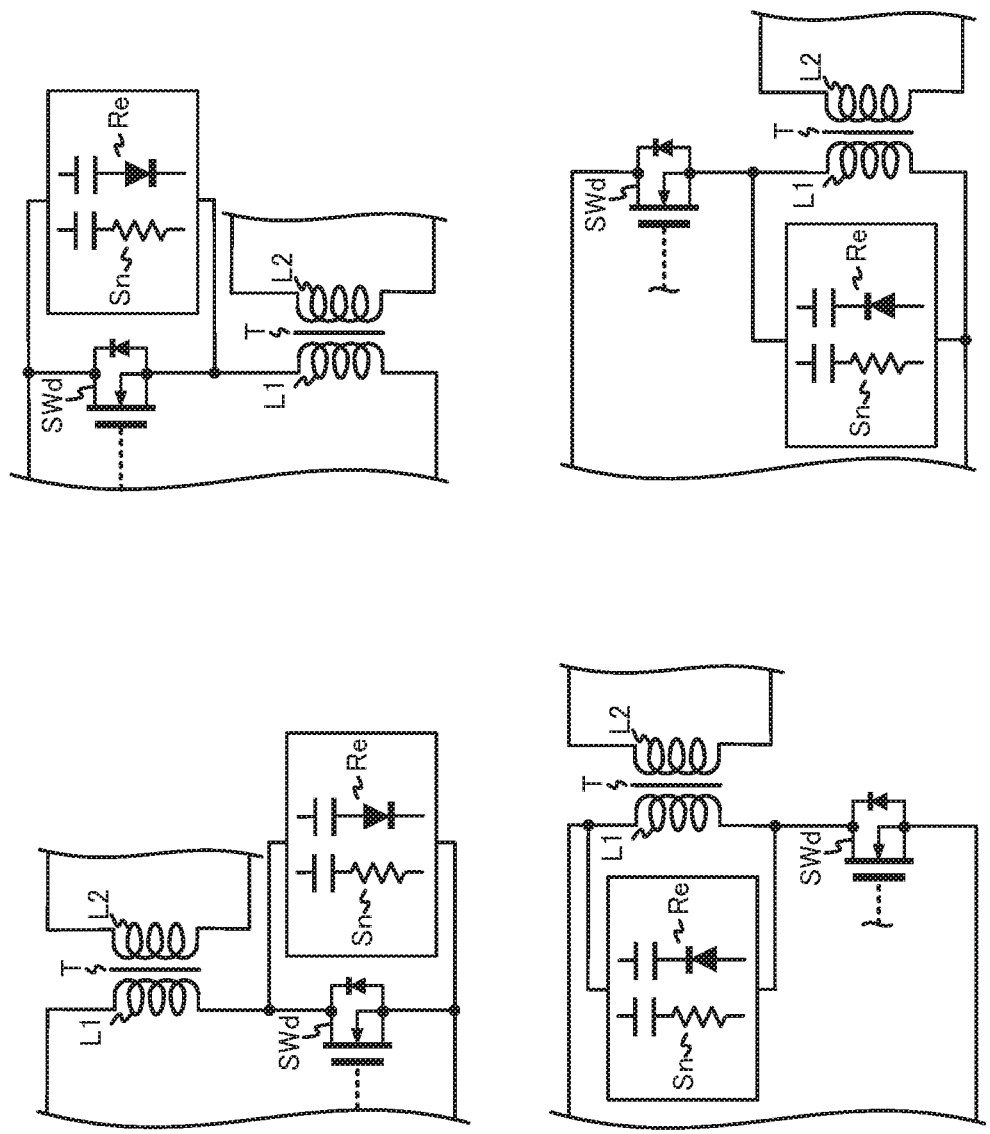
FIG. 19 illustrates an example of a reset circuit and a snubber circuit.

For example, while the DC-DC converter 1 illustrated in FIG. 1 through FIG. 18 are a DC-DC converter of the forward system, it may also be a DC-DC converter of the flyback system. When the DC-DC converter 1 is a DC-DC converter of the flyback system, the rectifier switch SWr1 and the inductor L are to be omitted. In the case of a DC-DC converter of the flyback system, it is preferable to change the reset circuit Re in FIG. 7 and FIG. 14 to a snubber circuit Sn. Meanwhile, the reset circuit Re and the snubber circuit Sn may be connected not to the both ends of the driving switch SWd but to the both ends of the primary winding L1. An example of the reset circuit Re and the snubber circuit Sn is illustrated in FIG. 19. The reset circuit is a serial connection of the capacitor and the diode, and the orientation of the diode is reverse to the orientation of the parasitic diode of the driving switch SWd when it is connected to the both ends of the driving switch SWd, and when it is connected to the both ends of the primary winding L1, the orientation with which the anode is on the negative side of the power source B and the cathode is on the positive side of the power source B. In the snubber circuit, the capacitor and the resistor are connected in series.

Meanwhile, while the DC-DC converter 1 illustrated in FIG. 1 through FIG. 6, FIG. 8 through FIG. 13 is in the active clamp system, it does not have to be in the active clamp system, and a general snubber circuit Sn, a reset circuit Re and the like may be provided. That is, a snubber circuit Sn, a reset circuit Re and the like may be connected to the connection point of the other of the terminals of the primary winding L1 and the other of the terminals of the driving switch SWd. Accordingly, it is possible to reduce ringing generated due to the turning on or off the cutoff switch SWb and the driving switch SWd, and therefore, it is possible to further suppress the withstand voltages of the cutoff switch SWb and the driving switch SWd.

What is claimed is:

1. A DC-DC converter comprising:
   a transformer;
   a cutoff switch connected between one of terminals of a primary winding of the transformer and one of terminals of a power source;
   a driving switch connected between another of the terminals of the primary winding and another of the terminals of the power source; and
   a control unit that alternately repeats:
   turning on both of the cutoff switch and the driving switch, and
   turning off both of the cutoff switch and the driving switch.

2. The DC-DC converter according to the claim 1, further comprising
   a reset switch in which one of terminals of the reset switch is connected to a connection point of one of the terminals of the cutoff switch and one of the terminals of the primary winding and another of the terminals of the reset switch is connected to a connection point of one of the terminals of the driving switch and another of the terminals of the power source, wherein
   the control unit alternately repeats turning on the cutoff switch and the driving switch while turning off the reset switch, and turning off the cutoff switch and the driving switch while turning on the reset switch.

3. The DC-DC converter according to claim 2, wherein
   a snubber circuit or a reset circuit is connected to a connection point between another of the terminals of the primary winding and another of the terminals of the driving switch.

4. The DC-DC converter according to claim 2, further comprising
   a clamp switch in which one of terminals of the clamp switch is connected to a connection point of another of the terminals of the primary winding and another of the terminals of the driving switch;
   a capacitor in which one of terminals of the capacitor is connected to another of the terminals of the clamp switch and another of the terminals of the capacitor is connected to a connection point of one of the terminals of the driving switch and another of the terminals of the power source, wherein
   the control unit alternately repeats turning on the cutoff switch and the driving switch while turning off the clamp switch, and turning off the cutoff switch and the driving switch while turning on the clamp switch.

5. The DC-DC converter according to claim 2, further comprising
   a clamp switch in which one of terminals of the clamp switch is connected to a connection point of another of the terminals of the primary winding and another of the terminals of the driving switch; and
   a capacitor in which one of terminals of the capacitor is connected to another of the terminals of the clamp switch and another of the terminals of the capacitor is connected to a connection point of one of the terminals of the cutoff switch and one of the terminals of the primary winding, wherein
   the control unit alternately repeats turning on the cutoff switch and the driving switch while turning off the clamp switch, and turning off the cutoff switch and the driving switch while turning on the clamp switch.

6. The DC-DC converter according to claim 1, further comprising
   a diode connected between a connection point of one of terminals of the cutoff switch and one of terminals of the primary winding, and a connection point of one of the terminals of the driving switch and another of the terminals of the power source.

7. The DC-DC converter according to claim 6, wherein
   a snubber circuit or a reset circuit is connected to a connection point between another of the terminals of the primary winding and another of the terminals of the driving switch.

8. The DC-DC converter according to claim 6, further comprising
   a clamp switch in which one of terminals of the clamp switch is connected to the connection point of another of the terminals of the primary winding and another of the terminals of the driving switch; and
   a capacitor in which one of terminals of the capacitor is connected to another of the terminals of the clamp switch and another of the terminals of the capacitor is connected to a connection point of one of the terminals of the driving switch and another of the terminals of the power source, wherein
   the control unit alternately repeats turning on the cutoff switch and the driving switch while turning off the clamp switch, and turning off the cutoff switch and the driving switch while turning on the clamp switch.

9. The DC-DC converter according to claim 6, further comprising
   a clamp switch in which one of terminals of the clamp switch is connected to a connection point of another of the terminals of the primary winding and another of the terminals of the driving switch; and
   a capacitor in which one of terminals of the capacitor is connected to another of the terminals of the clamp switch and another of the terminals of the capacitor is connected to a connection point of one of the terminals of the cutoff switch and one of the terminals of the primary winding, wherein
   the control unit alternately repeats turning on the cutoff switch and the driving switch while turning off the clamp switch, and turning off the cutoff switch and the driving switch while turning on the clamp switch.

10. The DC-DC converter according to claim 1, wherein
    a snubber circuit or a reset circuit is connected to a connection point of another of the terminals of the primary winding and another of the terminals of the driving switch.

11. The DC-DC converter according to claim 10, further comprising
    a clamp switch in which one of terminals of the clamp switch is connected to the connection point of another of the terminals of the primary winding and another of the terminals of the driving switch; and
    a capacitor in which one of terminals of the capacitor is connected to another of the terminals of the clamp switch and another of the terminals of the capacitor is connected to a connection point of one of the terminals of the driving switch and another of the terminals of the power source, wherein the control unit alternately repeats turning on the cutoff switch and the driving switch while turning off the clamp switch, and turning off the cutoff switch and the driving switch while turning on the clamp switch.

12. The DC-DC converter according to claim 10, further comprising
    a clamp switch in which one of terminals of the clamp switch is connected to the connection point of another of the terminals of the primary winding and another of the terminals of the driving switch; and
    a capacitor in which one of terminals of the capacitor is connected to another of the terminals of the clamp switch and another of the terminals of the capacitor is connected to a connection point of one of the terminals of the cutoff switch and one of the terminals of the primary winding, wherein
    the control unit alternately repeats turning on the cutoff switch and the driving switch while turning off the clamp switch, and turning off the cutoff switch and the driving switch while turning on the clamp switch.

13. The DC-DC converter according to claim 1, further comprising
    a clamp switch in which one of terminals of the clamp switch is connected to a connection point of another of the terminals of the primary winding and another of the terminals of the driving switch;
    a capacitor in which one of terminals of the capacitor is connected to another of the terminals of the clamp switch and another of the terminals of the capacitor is connected to a connection point of one of the terminals of the driving switch and another of the terminals of the power source, wherein
    the control unit alternately repeats turning on the cutoff switch and the driving switch while turning off the clamp switch, and turning off the cutoff switch and the driving switch while turning on the clamp switch.

14. The DC-DC converter according to claim 13, wherein the DC-DC converter is a DC-DC converter of a forward system.

15. The DC-DC converter according to claim 1, further comprising
    a clamp switch in which one of terminals of the clamp switch is connected to the connection point of another of the terminals of the primary winding and another of the terminals of the driving switch; and
    a capacitor in which one of terminals of the capacitor is connected to another of the terminals of the clamp switch and another of the terminals of the capacitor is connected to a connection point of one of the terminals of the cutoff switch and one of the terminals of the primary winding, wherein
    the control unit alternately repeats turning on the cutoff switch and the driving switch while turning off the clamp switch, and turning off the cutoff switch and the driving switch while turning on the clamp switch.

16. The DC-DC converter according to claim 15, wherein the DC-DC converter is a DC-DC converter of a forward system.

* * * * *